US009122415B2

(12) United States Patent
Tatara

(10) Patent No.: US 9,122,415 B2
(45) Date of Patent: Sep. 1, 2015

(54) STORAGE SYSTEM USING REAL DATA STORAGE AREA DYNAMIC ALLOCATION METHOD

(71) Applicant: Hitachi, Ltd., Tokyo (JP)

(72) Inventor: Kohei Tatara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/155,908

(22) Filed: Jan. 15, 2014

(65) Prior Publication Data
US 2014/0129770 A1 May 8, 2014

Related U.S. Application Data

(63) Continuation of application No. 13/202,968, filed as application No. PCT/JP2011/004442 on Aug. 4, 2011, now Pat. No. 8,650,381.

(51) Int. Cl.
*G06F 13/00* (2006.01)
*G06F 3/06* (2006.01)

(52) U.S. Cl.
CPC ............ *G06F 3/0665* (2013.01); *G06F 3/0604* (2013.01); *G06F 3/065* (2013.01); *G06F 3/067* (2013.01); *G06F 3/0619* (2013.01); *G06F 3/0689* (2013.01)

(58) Field of Classification Search
CPC ..... G06F 3/0604; G06F 3/0619; G06F 3/065; G06F 3/0665; G06F 3/067; G06F 3/0689
USPC ........................................................ 711/209
See application file for complete search history.

(56) References Cited

U.S. PATENT DOCUMENTS 7,613,896 B2 11/2009 Yamamoto et al.
2008/0263190 A1 10/2008 Serizawa et al.
2009/0094403 A1 4/2009 Nakagawa et al.

FOREIGN PATENT DOCUMENTS

| EP | 1 755 028 A1 | 2/2007 |
| JP | 2008-269424 A | 11/2008 |
| WO | WO-2010/131373 A1 | 11/2010 |
| WO | WO 2010/137065 A1 | 12/2010 |
| WO | WO 2011/052005 A1 | 5/2011 |

OTHER PUBLICATIONS

PCT International Search Report and Written Opinion on application PCT/JP2011/004442 mailed Apr. 23, 2012; 12 pages.

*Primary Examiner* — Yong Choe
(74) *Attorney, Agent, or Firm* — Foley & Lardner LLP

(57) ABSTRACT

The present invention aims at preventing the access performance of a distributed memory system by accessing via cross-over ownership a track mapping information formed as a hierarchical memory. In the process of assigning a real data storage area to a virtual volume, at first, a page from a pool is assigned, and thereafter, a track is assigned from said page. The page is composed of multiple tracks into which track data assigned at host write operation timings are stored sequentially from the top. A mapping information of the virtual volume and the page is stored in a control information page that differs from the track data, and the mapping information is stored in the control information page which could only be accessed by a microprocessor having the ownership of the virtual volume.

5 Claims, 22 Drawing Sheets

FIG. 4

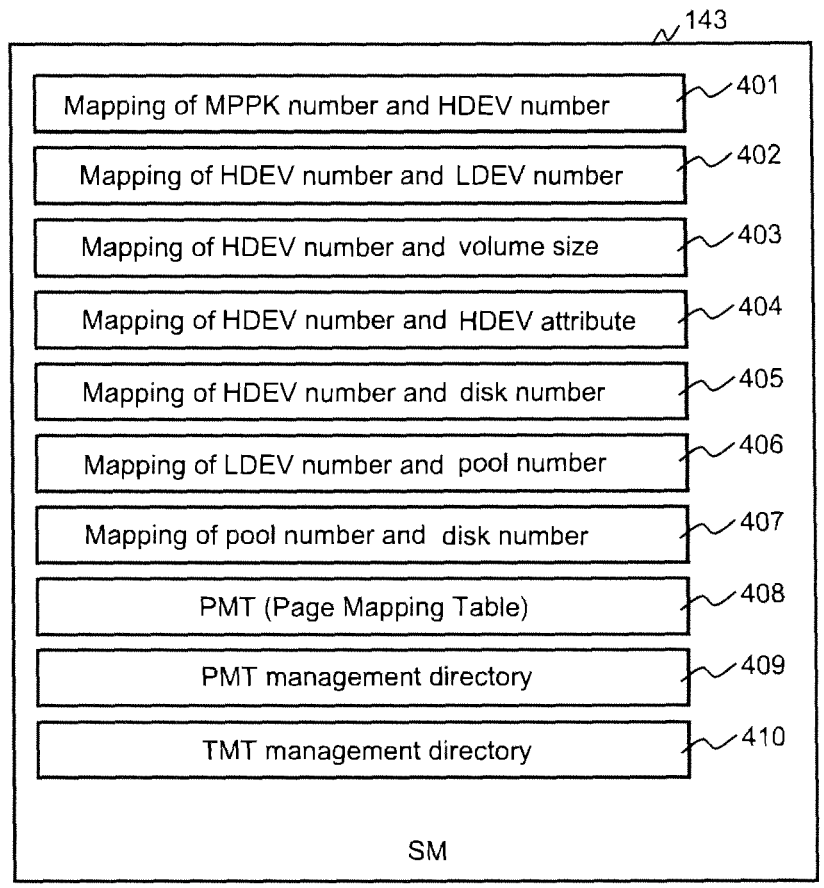

| | 143 |
|---|---|
| Mapping of MPPK number and HDEV number | 401 |
| Mapping of HDEV number and LDEV number | 402 |
| Mapping of HDEV number and volume size | 403 |
| Mapping of HDEV number and HDEV attribute | 404 |
| Mapping of HDEV number and disk number | 405 |
| Mapping of LDEV number and pool number | 406 |
| Mapping of pool number and disk number | 407 |
| PMT (Page Mapping Table) | 408 |
| PMT management directory | 409 |
| TMT management directory | 410 |

Mapping table of MPPK number and HDEV number

| MPPK number (501) | HDEV number (502) |
|---|---|
| 2 | 1 |
| 3 | 2 |
| ... | ... |

Mapping table of HDEV number and LDEV number

| HDEV number | LDEV number |
|---|---|
| 1 | 1 |
| 2 | 2 |
| 3 | 3 |
| ... | ... |

601 = HDEV number column, 602 = LDEV number column, 402

FIG. 7

Mapping table of HDEV number and volume size

| HDEV number | Volume size |
|---|---|
| 1 | 2TB |
| 2 | 1TB |
| 3 | 4TB |
| ... | ... |

701 = HDEV number column, 702 = Volume size column, 403

FIG. 8

Mapping table of HDEV number and HDEV attribute

| HDEV number | Volume attribute |
|---|---|
| 1 | Normal volume |
| 2 | Virtual volume |
| 3 | Virtual volume |
| ... | ... |

Mapping table of HDEV number and disk number

| HDEV number | Disk number |
|---|---|
| 1 | 1 |
|  | 2 |
| ... |  |

Mapping table of LDEV number, pool number and PMT address

| LDEV number | Pool number | PMT address in SM |
|---|---|---|
| 2 | 1 | 0xb0000000 |
| 3 | 2 | 0xb0000200 |
| ... | ... |  |

Mapping table of pool number and disk number

| Pool number | Disk number |
|---|---|
| 1 | 1 |
|   | 2 |
| 2 | 3 |
|   | 4 |
| ... | ... |

PMT (Page Mapping Table)

| Page number in LDEV (1201) | Page type (1202) | Page start address in LDEV (1203) | Disk number (1204) | Page start address in disk (1205) | Page assignment determination information (1206) |
|---|---|---|---|---|---|
| 1 | Control information | 0x00000000 | 1 | 0x00000100 | Assigned |
| 2 | User data | 0x00000100 | 2 | 0x00000200 | Unassigned |
| 3 | User data | 0x00000200 | 3 | 0x00000300 | Assigned |
| 4 | User data | 0x00000300 | 1 | 0x00000400 | Assigned |
| 5 | User data | 0x00000400 | 2 | 0x00000500 | Unassigned |
| ... | ... | ... | ... | ... | ... |

PMT (Page Mapping Table) management directory

| LDEV number (1301) | Address of page mapping table in SM (1302) |
|---|---|
| 1 | 0xC0000000 |
| 2 | 0xC0001000 |
| ... | ... |

TMT (Track Mapping Table) management directory

| LDEV number | Initial data track number in LDEV | Subsequent assignment track number in LDEV |
|---|---|---|
| 1 | 0 | 1 |
| 2 | 0 | 4 |
| ... | ... | |

FIG. 15

TMT (Track Mapping Table)

| Track number in HDEV | Track number in LDEV | Track assignment determination information |
|---|---|---|
| 0 | 128 | Assigned |
| 128 | 256 | Unassigned |
| 256 | 384 | Assigned |
| 384 | 512 | Assigned |
| 512 | 640 | Unassigned |
| ... | ... | ... |

FIG. 18

Copy BM table

| Track number (1801) | Copy status (1802) b'0: Not copied b'1: Copied | 1811 |
|---|---|---|
| 1 | b'1 | |
| 2 | b'0 | |
| ... | ... | |

FIG. 19

Difference BM table

| Track number (1901) | Update status (1902) b'0: Not updated b'1: Updated | 1911 |
|---|---|---|
| 1 | b'1 | |
| 2 | b'0 | |
| ... | ... | |

FIG. 20

Pair management table

| Pair number (2001) | Copy source | | Copy destination | | Copy BM table address (2006) | Difference BM table address (2007) |
|---|---|---|---|---|---|---|
| | HDEV number (2002) | Track range (2003) | HDEV number (2004) | Track range (2005) | | |
| 1 | 1 | 10~20 | 2 | 20~30 | 0xD0000100 | 0xE0000100 |
| 2 | 1 | 40~50 | 4 | 60~70 | 0xD0000200 | 0xE0000200 |
| 3 | 2 | 100~140 | 3 | 200~240 | 0xD0000300 | 0xE0000300 |
| 4 | 2 | 500~550 | 5 | 600~650 | 0xD0000400 | 0xE0000400 |
| ... | ... | ... | ... | ... | ... | ... |

2011

STORAGE SYSTEM USING REAL DATA STORAGE AREA DYNAMIC ALLOCATION METHOD

CROSS-REFERENCE TO RELATED PATENT APPLICATIONS

This application is a Continuation of U.S. application Ser. No. 13/202,968 (National Stage of PCT/JP2011/004442), filed Aug. 23, 2011, incorporated herein by reference in its entirety.

TECHNICAL FIELD

The present invention relates to a method for assigning a real data storage area dynamically to a control information area of a virtual volume in a storage device.

BACKGROUND ART

Patent literature 1 teaches arranging a plurality of microprocessors and local memories capable of being accessed only from respective microprocessors within a storage subsystem. According to this storage subsystem, each microprocessor executing an input/output processing of a storage device is provided with an ownership, and a cache control information necessary for performing the input/output processing of the relevant storage device is stored in a local memory of the microprocessor.

Further, patent literature 2 discloses a process related to dynamically allocating a real data storage area to a virtual storage area, wherein the real data storage area is assigned to the virtual storage area when a host write process occurs to the virtual storage area, and the address of the virtual storage area and the real storage are mapped. There is a drawback that the address mapping information required for input/output processing of the virtual storage area increases proportionally with the number and capacity of the virtual volumes, but this problem can be solved by storing the address mapping information in a memory device having inferior access performance but is inexpensive compared to local memories.

CITATION LIST

Patent Literature

[PTL 1]
PCT Publication No. 2010/131373
[PTL 2]
U.S. Pat. No. 7,613,896

SUMMARY OF INVENTION

Technical Problem

If the microprocessor having the ownership of the virtual storage device composed of virtual storage areas does not have the ownership of the storage device in which the address mapping information is stored, it cannot read the address mapping information required to perform the input/output processing of the virtual storage device. Even if the microprocessor has the ownership, since the microprocessor must cross over the ownership to access the volume, the performance of the microprocessor will be deteriorated. What is meant by crossing over the ownership to access the volume is, for example, that a microprocessor having the right to access a certain volume is changed (migration of ownership). Furthermore, according to the method for storing the address mapping information required for the input/output processing of data to the virtual storage area in a dispersed manner in storage devices having inferior access performances than the local memories, when accesses occur frequently, the accesses to address mapping information stored in the storage device will also increase. Therefore, the access performance of the whole system is deteriorated.

The present invention aims at improving the access performance of a storage system by storing the address mapping information of the virtual storage area and the real data storage area in a storage device and enabling a microprocessor having an ownership of the virtual storage device to access the same.

Solution to Problem

The above object can be achieved by the present invention having the following characteristics.

(1) A first real data storage area (hereinafter referred to as page) out of a plurality of storage devices is assigned to a first virtual storage area, and a second real data storage area (hereinafter referred to as track) is assigned to a second virtual storage area out of the page assigned to the first virtual storage area. A page is composed of a plurality of tracks, and track data is stored sequentially in the order assigned to the second virtual storage area.

(2) The size of the first address mapping information of the first virtual storage area and a plurality of storage devices is proportional to the number of pages, and is stored in a shared memory. The size of the second address mapping information of the second virtual storage area and the first virtual storage area is proportional to the number of tracks, and is stored in a page assigned to the first virtual storage area.

(3) By storing the second address mapping information required for input/output processing of data in a virtual storage device composed of second virtual storage areas in a page assigned to the first virtual storage area, a cache control information required for accessing the second address mapping information will be stored in a local memory of the microprocessor having the ownership of the virtual storage device.

Advantageous Effects of Invention

According to the present invention, a microprocessor is capable of exclusively executing the input/output processing of data in a virtual storage device storing an address mapping information in a storage device.

BRIEF DESCRIPTION OF DRAWINGS

FIG. 4 is a diagram showing management tables stored in a SM (Shared Memory).
FIG. 5 is a diagram showing a management table for managing the mapping of an MPPK (Micro Processor Package) number and an HDEV number.
FIG. 6 is a diagram showing a management table for managing the mapping of an HDEV (Host logical Device) number and an LDEV (Logical Device) number.

FIG. 7 is a diagram showing a management table for managing the mapping of the HDEV number and volume size.

FIG. 8 is a diagram showing a management table for managing the mapping of the HDEV number and an HDEV attribute.

FIG. 9 is a diagram showing a management table for managing the mapping of the HDEV number and a disk number.

FIG. 10 is a diagram showing a management table for managing the mapping of the LDEV number and a pool number.

FIG. 11 is a diagram showing a management table for managing the mapping of the pool number and the disk number.

FIG. 12 is a diagram showing a PMT (Page Mapping Table) used in a page assigning process.

FIG. 13 is a diagram showing a PMT management directory.

FIG. 14 is a diagram showing a TMT management directory.

FIG. 15 is a diagram showing the TMT (Track Mapping Table) used in a track assigning process of a page.

FIG. 18 is a diagram showing a management table for managing the track number and a copy status according to embodiment 2.

FIG. 19 is a diagram showing a management table for managing the track number and an update status according to embodiment 2.

FIG. 20 is a diagram showing a management table of a pair status according to embodiment 2.

DESCRIPTION OF EMBODIMENTS

Now, preferred embodiments of the present invention will be described with reference to the drawings. In the following description, various information are referred to as "management table" or other similar expressions, but the various information can be expressed by data structures other than tables. Further, the "management table" can also be referred to as "management information" to show that the data does not depend on the data structure.

Further in the present description, there are cases where a "program" is referred to as the subject of various processes. The program is executed by a processor such as an MP (microprocessor) for performing a predetermined process. Since the processes arbitrarily utilize storage resources (such as memories) and communication interface units (such as communication ports), the subject of the processes can also be the processor. The processor can include an MP and a dedicated hardware. The computer program can be installed in the various computers from a program source. The program source can be, for example, a program distribution server or a storage medium.

Furthermore, the respective elements, for example, LDEVs (logical devices) can be identified via numbers, but names or other various of identification information can also be used if they are identifiable. Equivalent elements are denoted by the same reference numbers according to the drawings and descriptions of the present invention, but the present invention is not restricted by the present embodiments, and all applicable examples complying with the concept of the present invention are included in the technical range of the present invention. The numbers of respective components can be one or more than one if numbers are not specifically determined.

Embodiment 1

A method for dynamically assigning a real data storage area to a control information area of a virtual volume in a storage device according to embodiment 1 of the present invention will be described with reference to FIGS. 1 through 17. The outline of a hardware structure and a software configuration (program structure, table structure) will be described first with reference to FIGS. 1 through 4, and then the details of the respective management tables will be described with reference to FIGS. 5 through 15. Lastly, the real operations (processes) will be described with reference to FIGS. 16 and 17.

Figure 1:
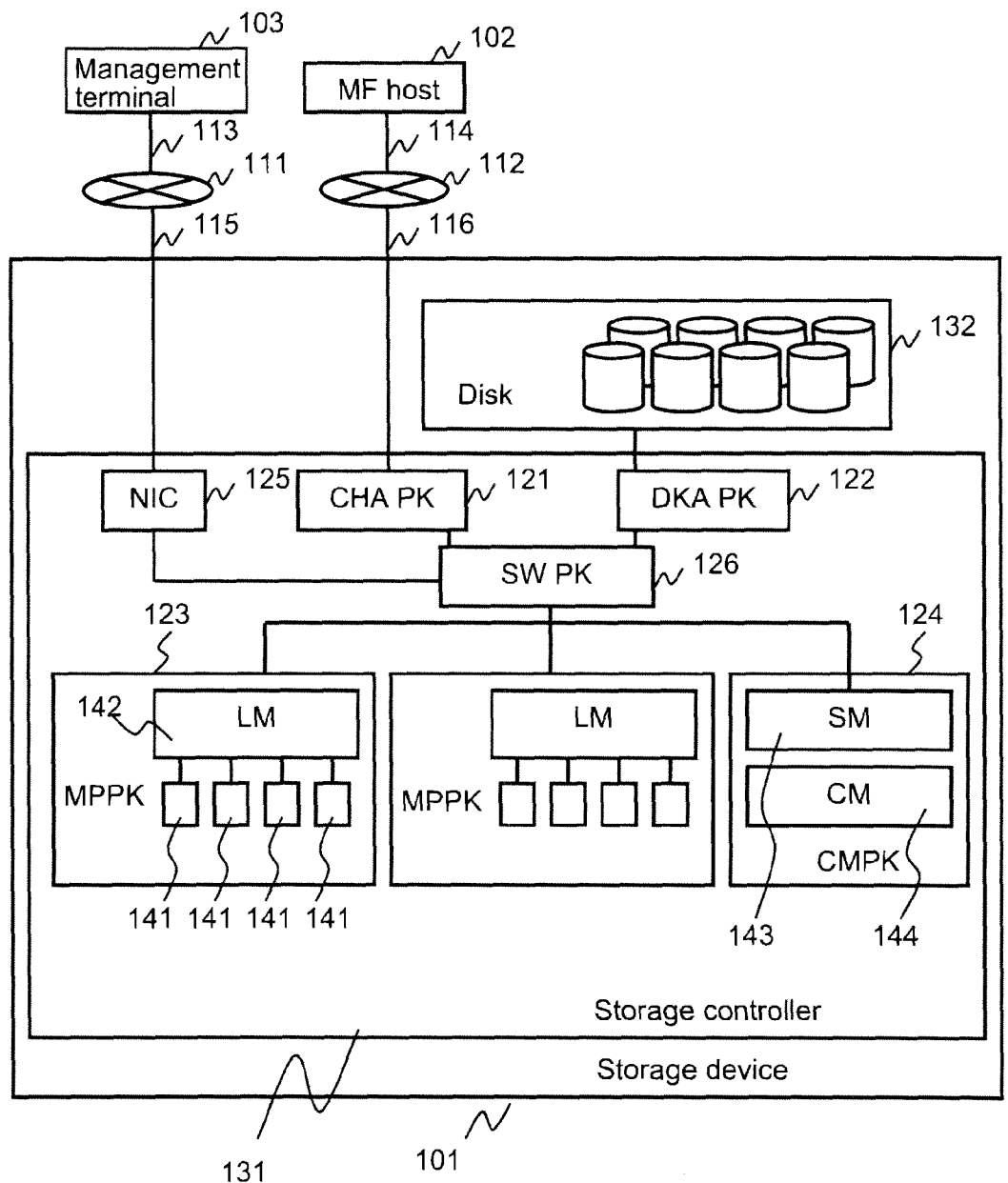
FIG. 1 is a block diagram showing the whole structure of a storage system.

First, the overall structure of a storage system will be described with reference to FIG. 1. The storage system is composed of a plurality of storage devices 101, a plurality of main frame host computers (hereinafter referred to as MF host computers) 102, and a management terminal computer 103.

The respective storage devices 101 and the respective MF host computers 102 are connected via a network 112. One of the plurality of storage devices 101 and the management terminal computer 103 are connected via a network 111. The respective MF host computers 102 are connected to the network 112 via a communication line 114. The respective storage devices 101 are connected to the network 112 via a communication line 116. The management terminal computer 103 is connected to the network 111 via a communication line 113. A first storage device 101 is connected to the network 111 via a communication line 115.

Now, the above-mentioned communication lines 113 through 116 are composed for example of wires such as metal cables or optical fiber cables. However, the respective MF host computers 102 and the respective storage devices 101, the respective storage devices 101 and the management terminal computer 103 or the respective MF host computers 102 and the management terminal computer 103 can also be connected in a wireless manner. In that case, the communication lines 113 through 116 are unnecessary. Further, the network 111 and the network 112 can be a common network. The respective networks 111 and 112 are communication networks, such as a SAN (Storage Area Network) or a LAN (Local Area Network).

Next, the structure of the respective storage devices 101 will be described. Each storage device 101 comprises one or more storage controllers 131 and one or more disks 132. The one or more disks 132 include at least an SSD (Solid State Drive), an SAS (Serial Attached SCSI) type HDD (Hard Disk Drive) and an SATA (Serial Advanced Technology Attachment) type HDD as storage devices for storing data. Other types of physical storage devices such as recordable optical disk media can be used instead of, or in addition to, the aforementioned storage devices included in the disk 132.

The one or more disks 132 are connected via a communication lines such as fiber channel cables to the storage controller 131. Further, multiple disks 132 can constitute one or more RAID (Redundant Array of Independent Disks) groups.

Next, the structure of the storage controller 131 will be described. The storage controller 131 performs an input/output processing of data with respect to the disk 132, in other words, the writing or reading of data to or from the disk 132, based on a command received from the respective MF host computers 102.

The storage controller 131 provides to the MF host computer 102 of the access request source a logical device having the real data storage area already assigned or a logical device composed of virtual storage areas used in a thin provisioning function described later as an access target logical device or logical volume.

The logical device composed of virtual storage areas can have the real data storage area already assigned or unassigned thereto. At that time, the storage controller 131 can refer to or identify the real data storage area or the virtual storage area using a cylinder head number (hereinafter referred to as a track number). The storage controller 131 includes a storage resource, a communication interface unit (hereinafter abbreviated as I/F) and a processor connected thereto.

The processor can be, for example, a MP (Micro Processor) 141 in a MPPK (Micro Processor Package) 123. The storage resource can be, for example, an LM (Local Memory) 142 in the MPPK 123, an SM (Shared Memory) 143 or a CM (Cache Memory) 144 in a CMPK (Cache Memory PacKage) 124.

The communication I/F comprises a CHAPK (CHannel Adapter PacKage) 121 for receiving read and write requests from the MF host computers 102, an NIC (Network Interface Card) 125 for receiving a local copy request from the management terminal computer 103, and a DKAPK (DisK Adapter PacKage) 122 for transmitting/receiving data to/from the disk.

The CMPK 124, the MPPK 123, the CHAPK 121, the NIC 125 and the DKAPK 122 are mutually connected via a communication line such as a bus and a SWPK (SWitch PacKage) 126 for switching communications.

The hardware structures of the respective MF host computers 102 and the management terminal computer 103 include a communication interface unit, a storage resource and a general computer having a processor connected thereto. The communication interface unit can be, for example, a Host Bus Adaptor (HBA) for performing communication via the network 112 and an NIC for performing communication via the network 111. The storage resource can be composed for example of a memory and an internal HDD.

Figure 2:
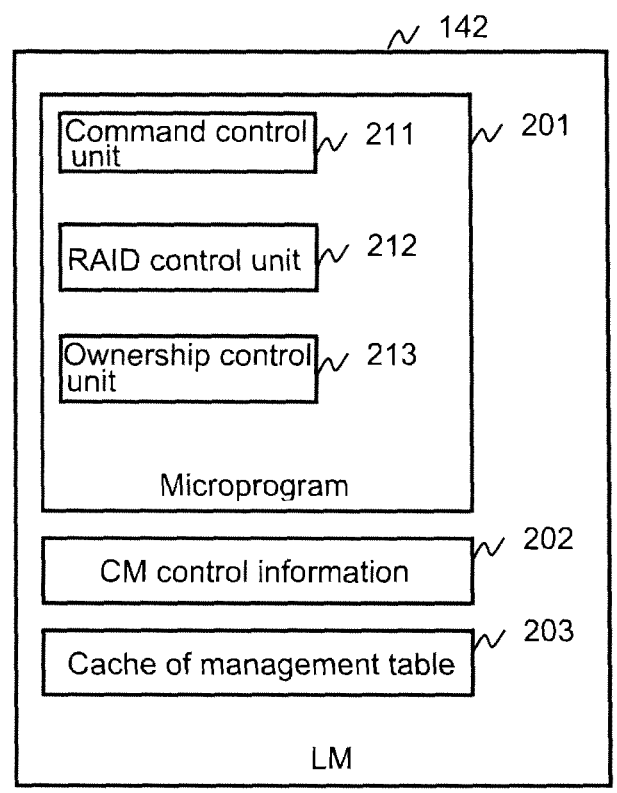
FIG. 2 is a diagram showing a configuration of a microprogram executed in a storage controller.

FIG. 2 illustrates a configuration of a microprogram 201 executed in the storage controller 131. One or more microprograms 201 are read into a local memory LM 142 in the drawing via the MP 141. The microprogram 201 includes a command control unit 211, a RAID control unit 212 and an ownership control unit 213. The various processes described later are performed by the MP 141 executing the control units 211 through 213 in the microprogram 201 read into the LM 142.

The CM control information 202 controls for example the information cached in the LM 142. Further, a cache 203 of the management table stores (caches) to the local memory LM 142 respective management tables (FIG. 4) stored in the shared memory SM 143. Thus, the MP 141 can acquire information on the respective management tables from the LM 142 that can be accessed at high speed instead of from the SM 143 requiring longer access time. The CM 144 temporarily stores the write data received from the respective MF host computers 102 and the data read from the disk 132 by the RAID control unit 212 in the microprogram 201.

The ownership control unit 214 is in charge of setting up or referring to a management table 401 managing the mapping of an MPPK number having the ownership of a HDEV mentioned later and the HDEV number thereof. In response to a setup request or a reference request from the command control unit 211 or the CHAPK 121, the mapping of the MPPK number having the ownership of an HDEV and the HDEV number thereof is either set up or referred to. Further, in an ownership migration process mentioned later, when the request to change ownership is output from the command control unit, the ownership control unit 214 sets up the mapping of the number of the MPPK having the ownership of an HDEV and the HDEV number thereof. Thereafter, old information in the copy of the management table 401 in the CHAPK 121 and the LM 142 is invalidated and updated to the latest information.

The CHAPK 121 is connected via the network 112 with the respective MF host computers 102 to receive an access command (or a write command or a read command) as an access request, and transfers the received access command to the command control unit 211. In the transfer process, the CHAPK 121 specifies the MPPK having the ownership of the HDEV based on the HDEV number included in the parameter of the read or write command and the copy of the management table 401 in the CHAPK 121. Thereafter, the CHAPK 121 transfers the access command to the command control unit 211 of the specified MPPK to process the read or write command.

The NIC 125 is connected via the network 111 with the management terminal computer 103, and when a data copy request for copying data between volumes as described later is received, the received request is transferred to the command control unit 211. The DKAPK 122 performs data transmission and data reception between the respective disks 132 and the storage resources (LM 142 and SM 143 and CM 144). The DKAPK 122 is connected via a communication path with the respective disks 132.

Next, the basic operation of the storage device 101 will be described. When a write command is received from one of the MF host computers 102 via the CHAPK 121, the storage controller 131 stores the write data received from the MF host computer 102 in the CM 144.

The storage controller 131 writes the write data stored in the CM 144 via the DKAPK 122 to the disk 132. The storage controller 131 sends a notice of completion of the write command process to the MF host computer 102 when the write data is stored in the CM 144 or when the write data is written into the disk 132.

When a read command is received from the MF host computer 102, the storage controller 131 checks whether the data designated in the parameter in the read command (read target data) is stored in the CM 144 or not.

If the read target data is stored in the CM 144, the storage controller 131 reads the read target data from the CM 144 and transmits the read target data read from the CM via the CHAPK 121 to the MF host computer 102. On the other hand, if the read target data is not stored in the CM 144, the storage controller 131 reads the read target data from one or more disks 132 via the DKAPK 122 and stores the same in the CM 144. Thereafter, the storage controller 131 transmits the read target data stored in the CM 144 via the CHAPK 121 to the MF host computer 102.

Figure 3:
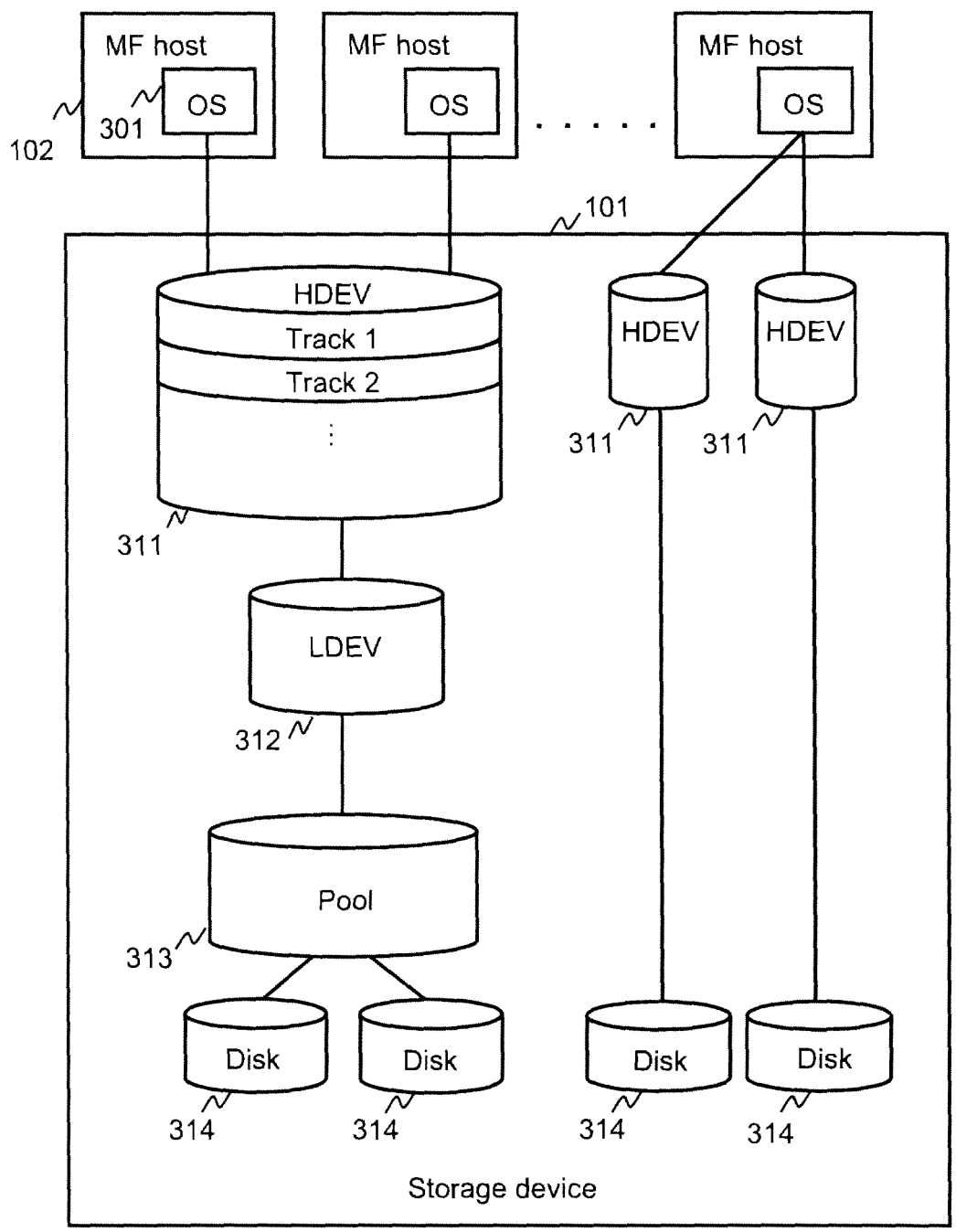
FIG. 3 is a block diagram showing a logical configuration in a storage device.

Next, the logical configuration of the storage device 101 will be described with reference to FIG. 3. The storage device 101 has one or more host logical devices (hereinafter referred to as HDEV) 311 as host logical devices constituting storage areas that the respective MF host computers 102 or the management terminal computer 103 refer to.

Each HDEV 311 has a unique HDEV number assigned thereto within the storage device 101, and the MF host computers 102 or the management terminal computer 103 identifies the HDEV 311 via the HDEV numbers. For example, the OS (Operating System) 301 of the respective MF host computers 102 performs a read access or a write access to the HDEV 311.

The HDEV 311 is composed of an assembly of tracks (track 1, track 2, track 3 and so on). Further, the cylinder head number (track number) assigned to the respective tracks will be the reference target for identifying the respective tracks by the respective MF host computers 102 or the management terminal computer 103. Now, the HDEV 311 is classified into a normal volume or a virtual volume by the management table 404 managing the HDEV number and the volume attribute shown in FIGS. 4 and 8.

If the HDEV 311 is a normal volume, it is defined as a storage area within one or more disks 132. The HDEV 311 can also be defined as a storage area composed of multiple RAID groups. If the HDEV 311 is a virtual volume, the track data within the HDEV 311 is stored in one or more logical devices (hereinafter also referred to as LDEV).

A unique LDEV number is assigned to the LDEV 312 within the storage device 101, and the microprogram 201 identifies the LDEV 312 by its LDEV number. The LDEV 312 is composed of multiple tracks corresponding to track numbers. Each track is composed of one or more records (not shown), and each record stores data read from or written by the MF host computer 102.

A track data corresponding to the track number within the aforementioned HDEV 311 is stored in the track within the LDEV 312. The association between the track number within the HDEV and the track number within the LDEV is managed by a TMT (Track Mapping Table) 410 shown in FIGS. 4 and 15.

At this time, the size of all tracks is the same within the storage device 101. Each disk 132 is provided with a unique disk number within the storage device 101, and the microprogram 201 identifies the respective disks 132 by the disk numbers.

The LDEV 312 is stored in the virtual volume used for the thin provisioning function. The virtual volume storing the data of the LDEV 312 is associated with a pool 313 providing the real data storage area for the relevant virtual volume. The pool 313 is provided with a unique pool number within the storage device 101, and the microprogram 201 identifies the pool 313 by the pool number.

The pool 313 is composed of one or more disks 132. The pool 313 can also be composed of one or more RAID groups. The one or more disks 132 can be disposed either within the storage device or outside the storage device.

FIG. 4 shows the structure of the respective management tables stored in the SM 143. The respective management tables are created either during activation of the storage device 101 or dynamically when necessary. The respective fields within the management tables 401 through 410 are updated when the logical configuration of the storage device 101 is altered.

FIG. 5 shows a management table 401 for managing the mapping of the MPPK number having the ownership of HDEV and the HDEV number thereof. The ownership determines the MPPK capable of processing the read or write request from the host to the HDEV.

The MPPK 123 having ownership can handle the necessary control information for processing the read or write request from the host to the HDEV 311 exclusively with respect to other MPPKs 123. The control information includes information indicating whether the read or write data with respect to the relevant HDEV 311 is cached in the CM 144 or not, or the PMT (Page Mapping Table) illustrated in FIGS. 12 and 13 if the HDEV has a virtual volume attribute. The table 401 managing the mapping of the MPPK number and the HDEV number is stored for example in the SM 143.

FIG. 6 illustrates a structure of a table 402 managing the mapping of the HDEV number and the LDEV number when the HDEV 311 is composed of virtual volumes. The management table 402 is composed of an HDEV number field 601 and an LDEV number field 602.

HDEV numbers are numbers for uniquely identifying the HDEV 311 within the storage device 101, and the numbers corresponding to the HDEV 311 are stored in the respective entries of the HDEV number field 601. LDEV numbers are numbers for uniquely identifying the LDEV 312 within the storage device 101, and the numbers corresponding to the LDEV 312 are stored in the respective entries of the LDEV number field 602. The management table 402 for managing the mapping of the HDEV number and the LDEV number is stored for example in the SM 143.

FIG. 7 illustrates a structure of a management table 403 for managing the mapping of the HDEV number and the volume size. The management table 403 is composed of an HDEV number field 701 and a volume size field 702. HDEV numbers are numbers for uniquely identifying the HDEV 311 within the storage device 101, and the numbers corresponding to the HDEV 311 are stored in the respective entries of the HDEV number field 701.

Volume sizes corresponding to the HDEV 311 are stored in the respective entries of the volume size field 702. Volume size refers to the maximum capacity for storing data in the normal volume or the virtual volume, and the capacities of the normal volume or the virtual volume are stored in numerical value in the respective entries of the volume size field 702. The management table 403 for managing the mapping of the HDEV number and the volume size is stored for example in the SM 143.

FIG. 8 illustrates a structure of a management table 404 for managing the mapping of the HDEV number and the volume attribute. The management table 404 is composed of an HDEV number field 801 and a volume attribute field 802. HDEV numbers are numbers for uniquely identifying the HDEV 311 within the storage device 101, and the numbers corresponding to the HDEV 311 are stored in the respective entries of the HDEV number field 801.

The volume attribute identifies whether the volume attribute of the HDEV 311 is a normal volume or a virtual volume, and the names of normal volumes or virtual volumes are stored in the respective entries of the volume attribute field 802.

If the volume attribute of the HDEV 311 is a normal volume, it means that the HDEV 311 is a volume composed of real data storage areas within one or more disks 132. The management table 404 for managing the mapping of the HDEV number and the volume attribute is stored for example in the SM 143.

FIG. 9 illustrates a structure of a management table 405 for managing the mapping of the HDEV number and the disk number when the HDEV 311 is a normal volume. The management table 405 is composed of an HDEV number field 901 and a disk number field 902. HDEV numbers are numbers for uniquely identifying the HDEV 311 within the storage device 101, and the numbers corresponding to the HDEV 311 are stored in the respective entries of the HDEV number field 901.

The disk numbers are numbers for uniquely identifying the disks 132 within the storage device 101, and the numbers of disks 132 composing the HDEV 311 are stored in the respective entries of the disk number field 902. The management table 405 for managing the mapping of the HDEV number and the disk number is stored for example in the SM 143.

FIG. 10 illustrates a structure of a management table 406 for managing the mapping of the LDEV number, the pool number and the PMP (Page Mapping Table) address within the SM 143. The management table 406 corresponds to the case where the volume attribute of the LDEV 312 is a virtual volume. The management table 406 is composed of an LDEV number field 1001, a pool number field 1002, and a PMT address field 1003 within the SM 143.

The LDEV numbers are numbers for uniquely identifying the LDEV 312 within the storage device 101, and the numbers corresponding to the LDEV 312 are stored in the respective entries of the LDEV number field 1001. The pool numbers are numbers for uniquely identifying the pool 313 within the storage device 101, and the numbers corresponding to the pool 313 associated with the LDEV 312 are stored in the respective entries of the pool number field 1002. PMP addresses (described later) within the SM 143 associated with the LDEV 312 are stored in the respective entries of the PMT address field 1003 within the SM. The management table 406 for managing the mapping of the LDEV number and the pool number is stored for example in the SM 143.

FIG. 11 illustrates a structure of a management table 407 for managing the mapping of the pool number and the disk number. The management table 407 corresponds to the case where the volume attribute of the HDEV 311 is a virtual volume, and the table is composed of a pool number field 1101 and a disk number field 1102.

The pool numbers are numbers for uniquely identifying the pools 313 within the storage device 101, and the numbers corresponding to the pools 313 are stored in the respective entries of the pool number field 1101. The disk numbers are numbers for uniquely identifying the disk 132 within the storage device 101, and the numbers of the disk 132 having its real data storage area assigned to the pool 313 are stored in the respective entries of the disk number field 1102. The management table 407 for managing the mapping of the pool number and the disk number is stored for example in the SM 143.

The present embodiment manages the HDEV 311 as a virtual volume having virtual storage areas, and when access occurs to the virtual volume, assigns a first real data storage area (hereinafter referred to as page) from the pool to the virtual volume, and further assigns a second real data storage area (track) from the first real data storage area (page).

The process for assigning the real data storage area to the virtual volume includes a page assigning process and a track assigning process f from a page. In the page assigning process, the PMT (Page Mapping Table) 408 and a PMT management directory 409 are used to assign a real data storage area to the LDEV in page units in response to a page assignment request for the LDEV. This function for assigning pages to the LDEV is called a thin provisioning function.

FIG. 12 illustrates a structure of a PMT (Page Mapping Table) 408 used for the page assigning process to the LDEV. The PMT 408 is composed of a page number field 1201, a page type field 1202, a page start address field 1203 within the LDEV, a disk number field 1204, a page start address field 1205 within the disk, and a page assignment determination information field 1206. The PMT 408 is created for each LDEV 312, and stored for example in the LM 142. The PMT can also be stored in the SM 143 and have the information cached in the LM 142.

Regarding the PMT 408, the combination of the page number 1201 within the LDEV, the page type 1202 corresponding to the page number 1201 within the LDEV, the page start address 1203 within the LDEV, the disk number 1204, the page start address 1205 within the disk and the page assignment determination information 1206 is called a page mapping entry.

The page numbers assigned within the LDEV 312 are stored in the respective entries of the page number field 1201. The page type field 1202 shows the types of information stored in the page assigned in the LDEV 312. The page type includes a user data page storing a track data read from or written by the MF host 102, or a control information page storing the TMT (Track Mapping Table) 410.

Start addresses of the pages assigned in the LDEV 312 are stored in the respective entries of the page start address field 1203 within the LDEV. The numbers of disks 132 constituting the LDEV 312 are stored in the respective entries of the disk number field 1204.

The page start address 1205 within the disk corresponds to the start address of the real data storage area within the disk, wherein the start addresses of the disks constituting the LDEV 312 are stored in the respective entries of the page start address field 1205 within the disk. If a page has been assigned to the LDEV 312, an "assigned" information is stored in the respective entry of the page assignment determination information field 1206, and if a page has not been assigned, an "unassigned" information is stored therein. In other words, this page assignment determination information enables the assignment status of the real data storage area to the LDEV to be managed in page units.

The page is a storage area having a given size stored in the pool 313, which is a unit for dividing and managing the storage area of the LDEV 312, and it is composed of one or more tracks. The track has a given size, such as 59,392 bytes, and is managed by the storage device 101.

FIG. 13 illustrates a structure of a PMT (Page Mapping Table) management directory 409 for managing the mapping of the LDEV 312 and the PMT 408. The PMT management directory 409 is composed of an LDEV number field 1301 and a PMT address field 1302, and is stored for example in the SM 143. The numbers of the LDEV 312 are stored the respective entries of the LDEV number field 1301. Addresses of the PMT 408 for managing the pages of the LDEV 312 are stored in the respective entries of the PMT address field 1302.

FIG. 14 illustrates a structure of a TMT (Track Mapping Table) management directory 410 for managing the assignment information from the LDEV 312 to the HDEV 311. The TMT management directory 410 is composed for example of an LDEV number field 1401, an initial data track number field 1402 within the LDEV, and a subsequent assignment track number field 1403 within the LDEV, and stored for example in the SM 143.

The numbers of LDEV 312 are stored in the respective entries of the LDEV number field 1401. Track numbers of initial data tracks in the LDEV 312 are stored in the respective entries of the initial data track number field 1402. Track numbers as candidates to be newly assigned subsequently in the LDEV 312 are stored in the respective entries of the subsequent assignment track number field 1403.

FIG. 15 illustrates a structure of a TMT (Track Mapping Table) 1511 used for executing the process for assigning tracks to the HDEV 311 from the pages assigned to the LDEV 312. The TMT 1511 is composed of a track number field 1501 within the HDEV, a track number field 1502 within the LDEV, and a track assignment determination information field 1503. The TMT 1511 is created for each HDEV 311 and stored in one or more pages within the LDEV 312.

Regarding the TMT 1511, the combination of the track number 1501 within the HDEV, the track number 1502 within the LDEV corresponding to the track number 1501 within the HDEV and the track assignment determination information 1503 is called a track mapping entry. The track numbers of tracks assigned to the HDEV 311 from the pages assigned to the LDEV 312 are stored in the respective entries of the track number field 1501 within the HDEV. The track numbers within the LDEV 312 assigned to the HDEV 311 are stored in the respective entries of the track number field 1502 within the LDEV.

If a track has been assigned to the HDEV 311, an "assigned" information is stored in the respective entries of the track assignment determination information field 1503, and if a track has not been assigned, an "unassigned" information is stored therein. In other words, the track assignment determination information enables the assignment status of the real data storage area from the LDEV to the virtual storage area to be managed in track units.

Figure 16:
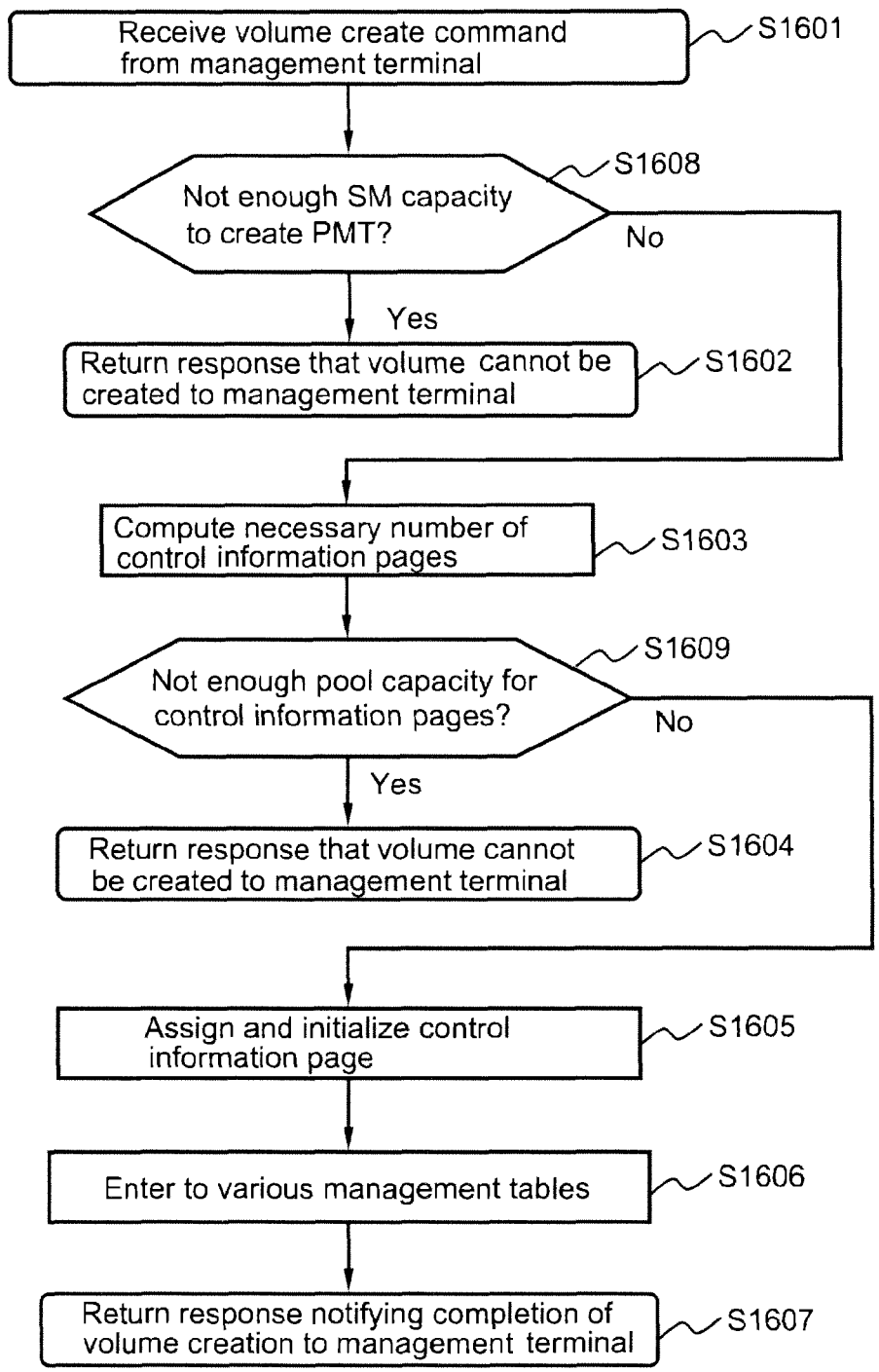
FIG. 16 is a flowchart of a virtual volume creation process according to embodiment 1.

Next, the operation of the present embodiment will be described with reference to FIGS. 16 and 17. First, the process in which the command control unit 211 creates an HDEV having a virtual volume attribute by receiving a virtual volume create command from the management terminal computer 103 will be described. The parameters of the virtual volume create command are, for example, the HDEV number (16-*a*) and the virtual volume size (16-*b*). The page size is, for example, 59,392×672 bytes.

Upon receiving the parameters of the virtual volume create command from the management terminal computer 103 (S1601), the command control unit 211 computes the SM size (16-*c*) required for creating the PMT (Page Mapping Table) based on the virtual volume size (16-*b*) and the page size (59,392×672 bytes).

If the size of the unallocated area in the SM 143 of the CMPK 124 is smaller than the SM size (16-*c*) (S1608: Yes), the command control unit 211 sends a response notifying that a volume cannot be created to the management terminal computer 103 (S1602). If the size of the unallocated area is greater than the SM size (16-*c*) (S1608: No), the command control unit 211 allocates the PMT 408 in the unallocated area of the SM 143 and acquires the PMT address (16-*d*).

The command control unit 211 computes the size (16-*e*) of the TMT (Track Mapping Table) required for the virtual volume based on the virtual volume size (16-*b*) and the track size. The command control unit 211 computes the number of a single page or a plurality of pages (control information page number) (16-*f*) storing the TMT based on the TMT size (16-*e*) and the page size (S1603).

If there is not enough pool capacity t with respect to the control information page number required for the virtual volume (S1609: Yes), the command control unit 211 sends a response notifying that a volume cannot be created to the management terminal computer 103 (S1604). If the control information pages required for the virtual volume can be allocated in the pool (S1609: No), the command control unit 211 assigns one or more control information pages from the pool to the virtual volume based on the control information page number (16-*f*). The command control unit 211 initializes the allocated one or more control information pages. The initial value thereof is, for example, "0" (S1605).

The command control unit 211 enters the MPPK number having the ownership of the relevant volume and the HDEV number (16-*a*) in an unused entry of the management table 401 (FIG. 5) for managing the mapping of the MPPK number and the HDEV number. The management terminal computer 103 can designate the MPPK number having the ownership of the relevant volume in the parameters of the virtual volume create command. The command control unit 211 can decide the MPPK number, whose processing load is the smallest in the system device as the MPPK number having the ownership of the relevant volume.

The command control unit 211 enters the HDEV number (16-*a*) and an unused LDEV number (16-*g*) in an unused entry of the management table 402 (FIG. 6) for managing the mapping of the HDEV number and the LDEV number.

The command control unit 211 enters the HDEV number (16-*a*) and the volume size (16-*b*) in an unused entry of the management table 403 (FIG. 7) for managing the mapping of the HDEV number and the volume size.

The command control unit 211 enters the HDEV number (16-*a*) and the "virtual volume" attribute in an unused entry of the management table 404 (FIG. 8) for managing the mapping of the HDEV number and the HDEV attribute.

The command control unit 211 enters the LDEV number (16-*g*), the pool number performing page assignment to the LDEV and the PMT address (16-*d*) in an unused entry of the management table 406 (FIG. 10) for managing the mapping of the LDEV number (16-*g*), the pool number and the PMT address.

Further, the command control unit 211 performs a process for assigning a new track from the LDEV having the LDEV number (16-*g*), and acquires the track number (16-*h*) of the assigned track and the track number of a track to be assigned subsequently in the LDEV (16-*i*). Thereafter, the LDEV number (16-*g*), the initial data track number within the LDEV (16-*h*) and the track number of a track to be assigned subsequently in the LDEV (16-*i*) are entered to the unused entry of the TMT (Track Mapping Table) 410 (FIG. 14) (S1606). Lastly, the command control unit 211 sends a response notifying that volume creation is completed to the management terminal computer 103 (S1607).

Next, the process performed by the command control unit 211 upon receiving a write access from the MF host computer 102 will be described with reference to FIG. 17. The parameters of the write access are, for example, the HDEV number (17-*a*) and the track number (17-*b*) within the HDEV. The page size is, for example, 59,392×672 bytes (S1701).

Upon receiving the parameters of the write access from the MF host computer 102, the command control unit 211 computes the address (17-*c*) within the HDEV 311 based on the track number (17-*b*) of the HDEV 311 and the track size.

The command control unit 211 acquires the LDEV number (17-*d*) corresponding to the HDEV 311 based on the HDEV number (17-*a*) and the management table 402 (FIG. 6) for managing the mapping of the HDEV number and the LDEV number. The command control unit 211 acquires a PMT 408 (FIG. 13) corresponding to the LDEV number (17-*d*) based on the LDEV number (17-*d*) and the PMT management directory 409. The command control unit 211 examines one or more page mapping entries of the PMT 408 in which the page type 1202 is a control information page, and acquires the position of the TMT 1511 from the page start address 1203 within the LDEV (S1702).

The command control unit 211 acquires a track mapping entry (17-*e*) corresponding to the track number (17-*a*) based on the position of the TMT 1511 and the track number (17-*a*).

The command control unit 211 refers to the track assignment determination information field 1503 within the track mapping entry (17-*e*), and if the track assignment determination information field 1503 is set to "assigned" (S1705: No), the following operations (W1) through (W6) are performed.

(W1) The command control unit 211 acquires the track number (17-*f*) within the LDEV in the track mapping entry (17-*e*).

(W2) The command control unit 211 computes the page number (17-*g*) within the LDEV including the track number (17-*f*) and the offset (17-*h*) from the start address within said page based on the track number (17-*f*) and the page size.

(W3) The command control unit 211 acquires the page mapping entry (17-*i*) corresponding to the page number (17-*g*) within the LDEV based on the PMT 408 and the page number (17-*g*) within the LDEV.

(W4) The command control unit 211 acquires the page start address (17-*j*) on the disk based on the page mapping entry (17-*i*) and adds the offset (17-*h*) to compute the address (17-*k*) of the write target track on the disk.

(W5) The command control unit 211 writes data transmitted from the MF host computer 102 to the address (17-*k*) (S1703).

(W6) A response notifying that the write command has been completed is transmitted to the MF host computer (S1704).

The command control unit 211 refers to the track assignment determination information field within the track mapping entry (17-*e*), and when the track assignment determination information field is set to "unassigned" (S1705: Yes), the following operation is performed.

At first, the command control unit 211 enters the track number (17-*l*) within the LDEV designated by the subsequent assignment track address 1403 of the TMT management directory 410 (FIG. 15) to the track number of the track entry (17-*e*) within the TMT.

The command control unit 211 further sets the track assignment determination information field to "assigned". Then, the value of the subsequent assignment track address 1403 of the TMT management directory 410 is incremented and set as the candidate target for the subsequent track assignment (S1706 through S1709). Thereafter, the command control unit 211 performs the aforementioned processes (W1) through (W6). The processes (W1) through (W6) are referred to as "S1711" in the following description.

If the page assignment determination information in the page mapping entry (17-*i*) acquired in (W3) is "unassigned" (S1706: Yes), the command control unit 211 refers to the management table 406 (FIG. 10) for managing the mapping of the LDEV number, the pool number and the PMT address, and acquires the pool number (17-*m*) corresponding to the LDEV number (17-*d*).

The command control unit 211 refers to the management table 407 (FIG. 11) for managing the mapping of the pool number and the disk number based on the acquired pool number (17-*m*), and acquires the disk number (17-*n*) corresponding to the pool number (17-*m*).

The command control unit 211 assigns the real data storage area in page units from one or more disks 132 belonging to the pool 313 corresponding to the LDEV number (17-*d*) based on the acquired disk number (17-*n*) (S1707).

At this time, the command control unit 211 refers to the PMT 408 (FIG. 12) to search for the page entry including the track designated by the write destination address, enter the start address of the newly assigned page to the PMT 408, set the page assignment determination information field 1206 from "unassigned" to "assigned", and update the PMT 408. The above description illustrated the process performed when the command control unit 211 receives a write access from the MF host computer 102.

When a read access is received from the MF host computer 102, the command control unit computes the address (17-*k*) of the read target track based on (W1) through (W4) mentioned earlier, and transmits the address (17-*k*) data to the MF host computer 102.

The command control unit 211 refers to the track assignment determination information field within the track mapping entry (17-*e*), and when the track assignment determination information field is set to "unassigned", the unit enables the track of the initial data track number 1402 (FIG. 14) in the TMT management directory 410 (FIG. 4) to be read by the MF host computer 102.

The above-description illustrated the process for assigning a page to the LDEV from the pool with respect to the virtual volume and assigning a track to the HDEV from the LDEV. According to this process, the track mapping information designed as a hierarchical memory (FIG. 3) of a distributed memory system (FIG. 1) can be accessed without crossing over the ownership. Thus, a high speed access to the track mapping information, in other words, a high speed access to the volume, can be realized.

Embodiment 2

Embodiment 2 of the present invention related to the data copy process from a normal volume to a virtual volume will be described with reference to FIGS. 18 through 24. Really, a copy source HDEV 311 (primary volume) is managed as a normal volume composed of real data storage areas, and a copy destination HDEV 311 (secondary volume) is managed as a virtual volume composed of virtual storage areas, wherein data is copied between the primary volume (18-*a*) and the secondary volume (18-*b*).

FIG. 18 illustrates a structure of a management table (copy BM table) 1811 for managing the track numbers and the copy statuses thereof. The copy BM table 1811 is composed of a track number field 1801 and a copy status field 1802. The track number is a number for uniquely identifying tracks within the HDEV 311, and numbers corresponding to respective tracks within the HDEV 311 are stored in the respective entries of the track number field 1801.

The copy status specifies whether the track is "copied" or "not copied", and information indicating that the respective tracks are "copied" (for example, the bit is on "b'1'") or "not copied" (for example, the bit is off "b'0'") are stored in the respective entries of the copy status field 1802.

FIG. 19 shows a structure of a table (difference BM table) 1911 managing the track number and the update status thereof. The difference BM table 1911 is composed of a track number field 1901 and an update status field 1902.

The track number is a number for uniquely identifying the tracks within the HDEV 311, and numbers corresponding to respective tracks within the HDEV 311 are stored in the respective entries of the track number field 1901.

The update status specifies whether the track is "updated" or "not updated", and information indicating that the respective tracks are "updated" (for example, the bit is on "b'1'") or "not updated" (for example, the bit is off "b'0'") are stored in the respective entries of the update status field 1902.

FIG. 20 illustrates a structure of a pair management table 2011 used for executing the copying process between HDEVs. The pair management table 2011 is composed of a pair number field 2001, a copy source HDEV number field 2002, a copy source track range field 2003, a copy destination HDEV number field 2004, a copy destination track range field 2005, a copy BM table address field 2006, and a difference BM table address field 2007, wherein the table is created for each copy pair and stored for example in the SM 143.

Pair numbers allocated to the respective pairs are stored in the respective entries of the pair number field 2001 of the pair management table 2011. HDEV numbers of the copy source HDEV are stored in the respective entries of the copy source HDEV number field 2002. Copy start track number and copy end track number of the copy source HDEV are stored in the respective entries of the copy source track range field 2003.

HDEV numbers of the copy destination HDEV are stored in the respective entries of the copy destination HDEV number field 2004. Copy start track number and copy end track number of the copy destination HDEV are stored in the respective entries of the copy destination track range field 2005. Addresses of the copy BM table are stored in the respective entries of the copy BM table address field 2006. Addresses of the difference BM table are stored in the respective entries of the difference BM table address field 2007.

Figure 21:
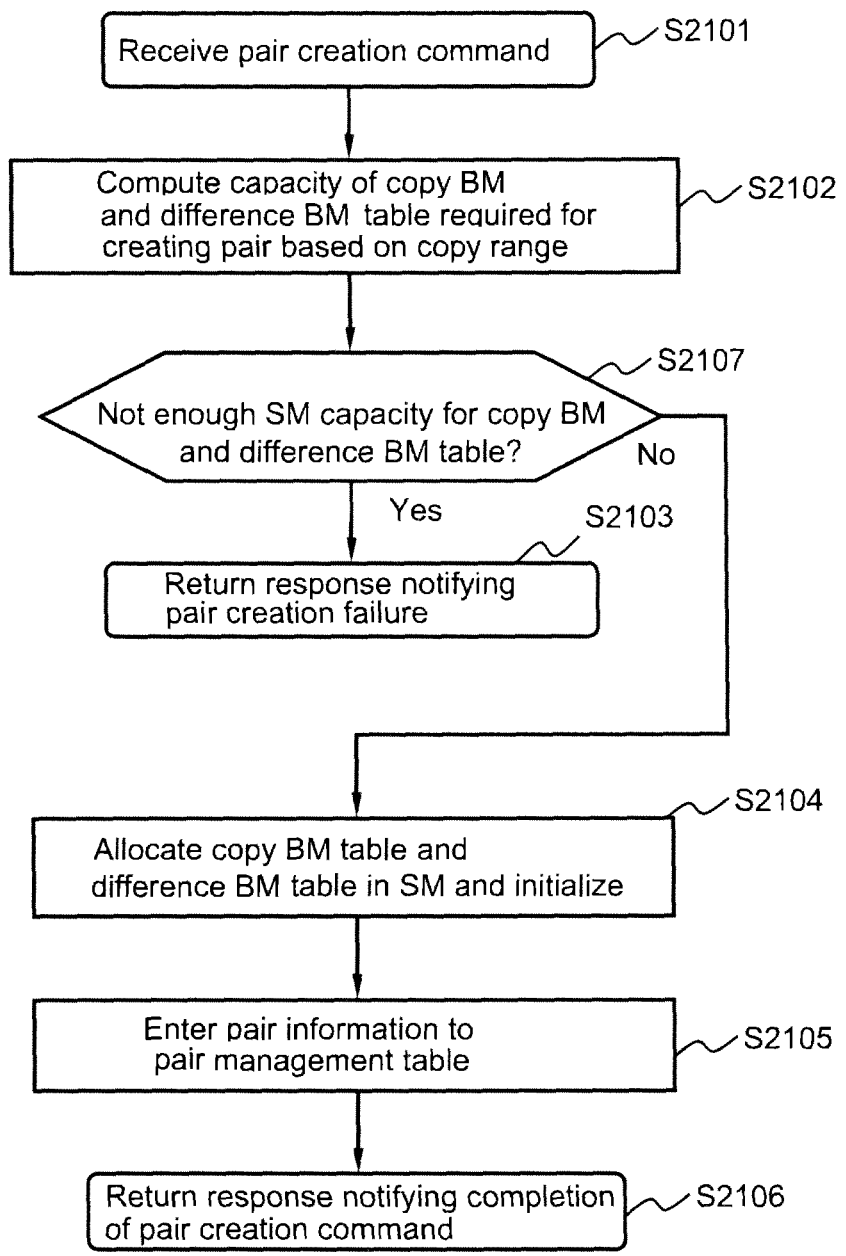
FIG. 21 is a flowchart of a copy pair creation process according to embodiment 2.

Next, a pair creation process during copying of data from the HDEV 311 having a normal volume attribute (primary volume) to the HDEV 311 having a virtual volume attribute (secondary volume) will be described with reference to FIG. 21. When a copy pair creation command between the primary volume (21-*a*) and the secondary volume (21-*b*) is received from the management terminal computer 103, the command control unit 211 performs the following processes.

The command parameters are, for example, an HDEV number (21-*c*) of the primary volume (21-*a*) and an HDEV number (21-*d*) of the secondary volume (21-*b*), a copy source track range (21-*e*) of the primary volume (21-*a*), and a copy destination track range (21-*f*) of the secondary volume (21-*b*). The number of tracks of the copy source track range (21-*e*) and the number of tracks of the copy destination track range (21-*f*) are the same (S2101).

The command control unit 211 computes the capacity of SM 143 required for the copy BM table 1811 and the difference BM table 1911 from the copy source track range (21-*e*) or the copy destination track range (21-*f*) (S2102). If the capacity of SM 143 required for the copy BM table 1811 and the difference BM table 1911 cannot be allocated (S2107: Yes), the command control unit 211 sends a response notifying that pair creation has failed to the management terminal computer 103 (S2103).

If it is possible to allocate the capacity of SM 143 required for the copy BM table 1811 and the difference BM table 1911 (S2107: No), the command control unit 211 allocates the copy BM table 1811 and the difference BM table 1911 in the SM 143. The command control unit 211 initializes the allocated copy BM table 1811 and the difference BM table 1911. A typical initial value is "0", but the initial value is not restricted thereto (S2104).

The command control unit 211 newly assigns an unused pair number in the pair management table 2011. Then, the command control unit 211 sets the HDEV number (21-*c*) of the primary volume (21-*a*) and the HDEV number (21-*d*) of the secondary volume (21-*b*), the copy source track range (21-*e*) of the primary volume (21-*a*), the copy destination track range (21-*f*) of the secondary volume (21-*b*), the address of the copy BM table 1811 and the address of the difference BM table 1911 (S2105) as pair entries (21-*g*) (S2105).

The command control unit 211 sends a response notifying completion of the pair creation command to the management terminal computer 103 (S2106). The above description illustrates the operation of the pair creation process for copying data from the HDEV 311 having a normal volume attribute to the HDEV 311 having a virtual volume attribute.

Figure 22:
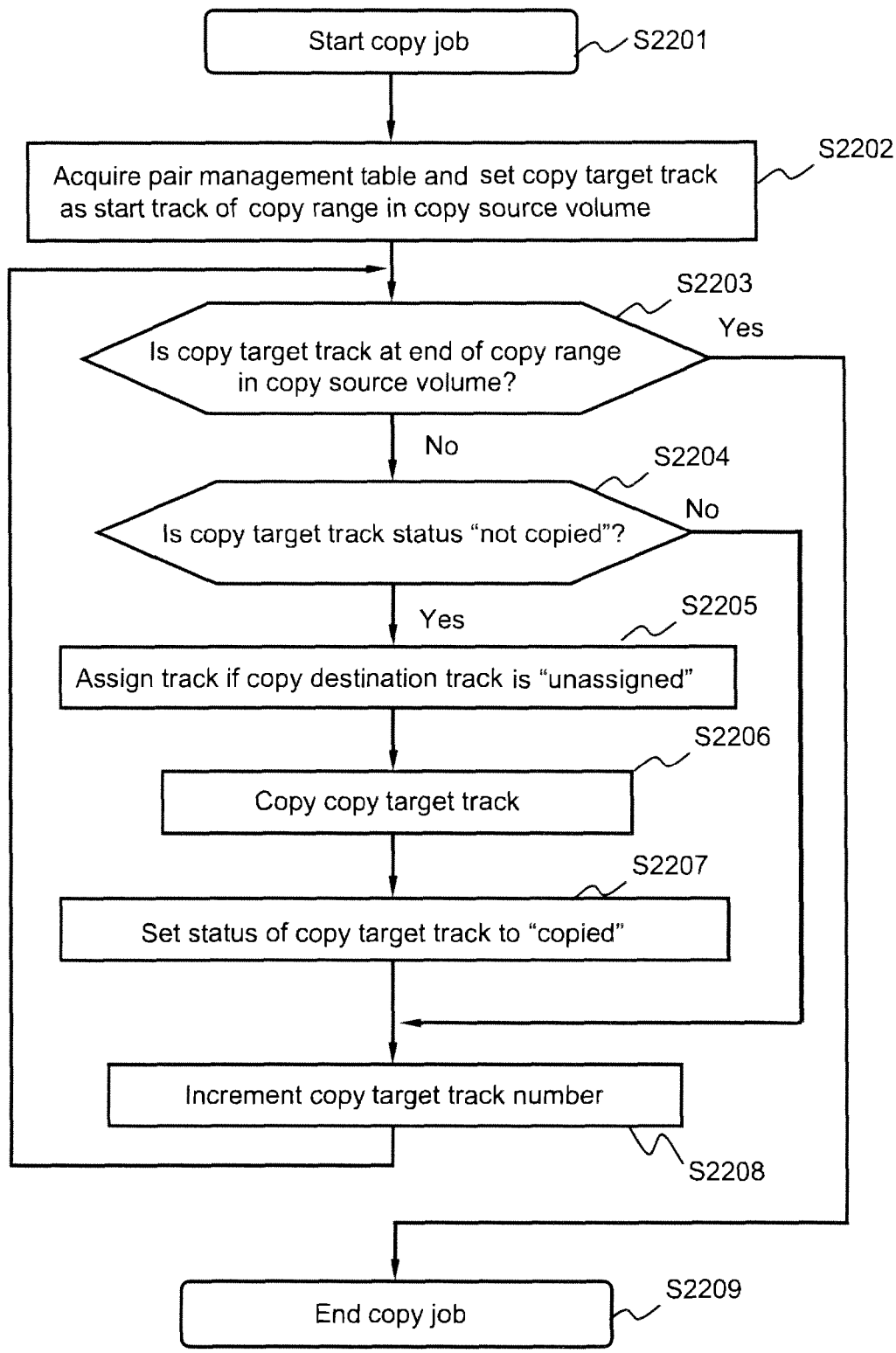
FIG. 22 is a flowchart of a background copying process in a copy job according to embodiment 2.

Next, the operation of a copy job in copying data from the HDEV 311 having a normal volume attribute (primary volume) to the HDEV 311 having a virtual volume attribute (secondary volume) will be described with reference to FIG. 22.

The command control unit 211 starts a copy job (not shown) after performing the aforementioned pair creation process. In the copy job, the data copying process is performed based on the pair entries (21-*g*) set in the aforementioned pair creation process (S2201).

The copy job refers to the pair entries (21-*g*) and enters the copy target track number (21-*h*) as a start track number of the copy source track range of the primary volume (21-*a*) (S2202). The copy job performs the processes (C1) to (C7) sequentially until the copy target track number (21-*h*) reaches an end track number of the copy source track range (S2203: "Yes").

(C1) The copy job acquires a copy BM table 1811 from the copy BM table address in the pair entry (21-*g*).

(C2) The copy job computes the offset (21-*j*) from the copy start track number (21-*i*) based on the copy target track number (21-*h*) and the copy start track number (21-*i*) of the primary volume (21-*a*).

At this time, the difference between the track numbers (21-*h*) and (21-*i*) and the value of the offset (21-*j*) are equal.

(C3) The copy job acquires the copy status of the track number (21-*h*) based on the offset (21-*j*) from the copy start track number (21-*i*) and the copy BM table 1811.

(C4) If the copy status of the track number (21-*h*) is "copied" ("No" in S2204), the copy job increments the copy target track number (21-*h*) (S2208) and returns to (C1) without performing the subsequent steps (C5) through (C7).

(C5) If the copy status of the track number (21-*h*) is "not copied" ("Yes" in S2204), the copy job computes a copy destination track number (21-*l*) in the secondary volume (21-*b*) based on the copy start track number (21-*k*) in the secondary volume (21-*b*) of the pair entry (21-*g*) and the offset (21-*j*).

(C6) The copy job copies the track data of the track number (21-*h*) of the primary volume (21-*a*) to the copy destination track number (21-*l*) of the secondary volume (21-*b*) (S2206). The command control unit 211 refers to the TMT 1511, and if the assignment determination information of the copy destination track number (21-*l*) is "unassigned", a new track is assigned to the copy destination track number (21-*l*) of the secondary volume (21-*b*) as mentioned earlier (S1711: (W1) through (W6)).

(C7) The copy job sets the copy status of the copy BM table corresponding to the track number (21-*h*) of the primary volume (21-*a*) to "copied" (S2207).

The above-mentioned process is the operation of the copy job for copying data from the HDEV 311 having a normal volume attribute to the HDEV 311 having a virtual volume attribute.

Figure 23:
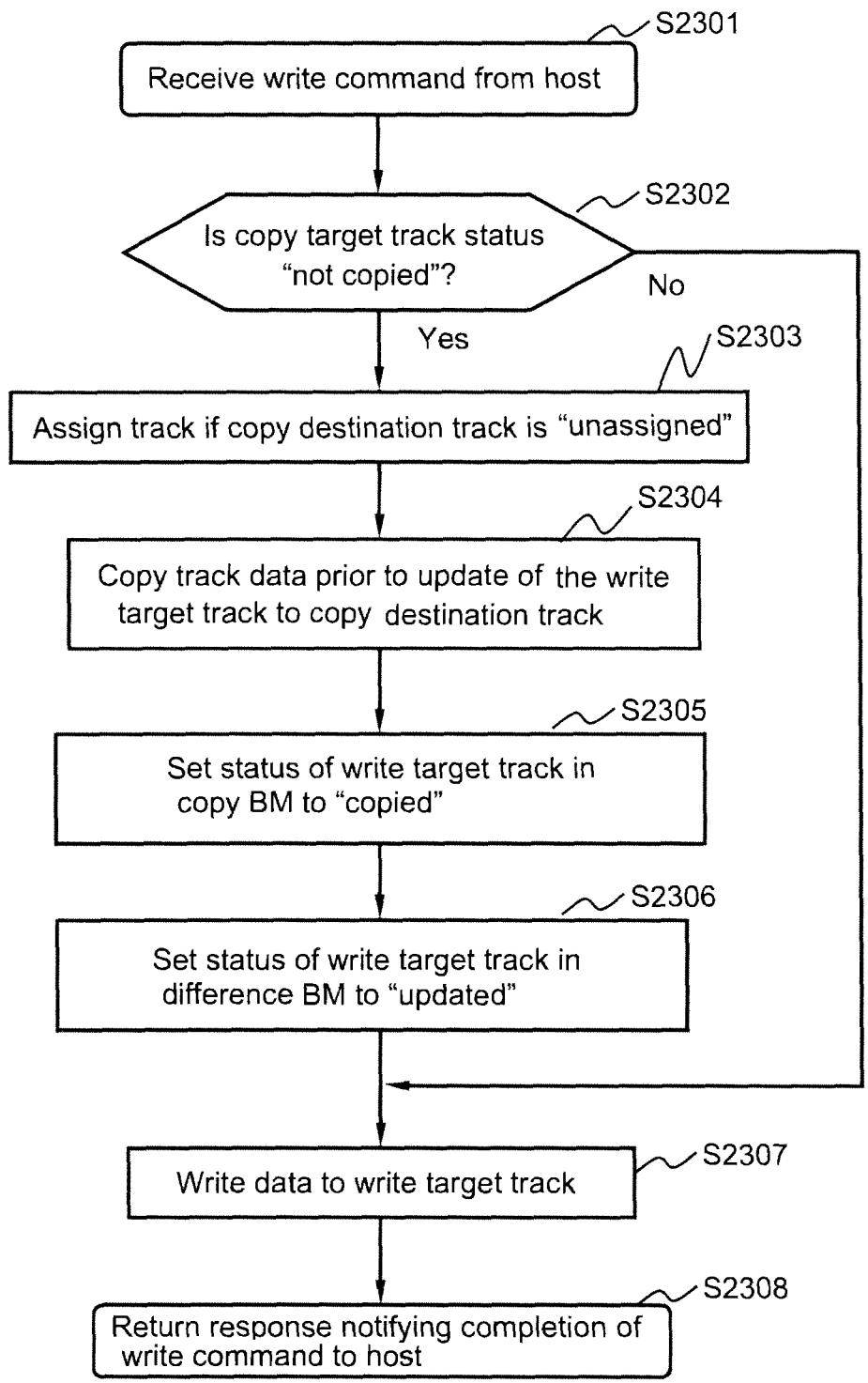
FIG. 23 is a flowchart for explaining a preceding copy process when a host write command occurs in embodiment 2.

Next, a preceding copy operation via a write operation from the MF host computer 102 during copying of data from the HDEV 311 having a normal volume attribute (primary volume) to the HDEV 311 having a virtual volume attribute (secondary volume) will be described with reference to FIG. 23.

When the command control unit 211 receives a write command related to the primary volume (23-*a*) from the MF host computer 102 (S2301), the operations of (CW1) through (CW8) are performed. At this time, the command parameters are, for example, the HDEV number (23-*b*) of the primary volume (23-*a*) and the track number (23-*c*) of the write target track.

The command control unit 211 acquires one or more pair entries from the pair management table 2011 in which the copy source HDEV number is (23-*b*). The command control unit 211 performs the following operations for the respective pair entries.

(CW1) The command unit 211 examines whether the track number (23-*c*) of the write target track is included in the copy source track range within the pair entry. If the track number is not included, the processes of (CW2) through (CW8) are skipped and no operation is performed.

(CW2) The command control unit 211 acquires a copy BM table 1811 from a copy BM table pointer within the pair entry.

(CW3) The command control unit 211 computes the offset (23-*e*) from the copy start track number based on the track number (23-*c*) of the primary volume (23-*a*) and the copy start track number (23-*d*) in the copy source HDEV of the pair entry. At this time, the difference between track numbers (23-*c*) and (23-*d*) and the value of (23-*e*) are equal.

(CW4) The command control unit 211 acquires a copy status of the track number (23-*c*) based on the offset (23-*e*) from the copy start track number and the copy BM table 1811.

(CW5) If the copy status of the track number (23-*c*) is "copied" ("No" in S2302), the command control unit 211 performs the process of (CW8) without performing the processes of (CW6) and (CW7).

(CW6) If the copy status of the track number (21-*c*) is "not copied" ("Yes" in S2302), the command control unit 211 computes the copy destination track number (23-*g*) of the copy destination HDEV based on the copy start track number (23-*f*) of the copy destination HDEV in the pair entry and the offset (23-*e*) (S2303).

(CW7) The command control unit 211 copies the track data prior to update of the track number (23-*c*) of the primary volume (23-*a*) to the copy destination track number (23-*g*) of the secondary volume (S2304). The command control unit 211 sets the copy status of the copy BM table 1811 corresponding to the track number (23-*c*) of the primary volume (23-*a*) to "copied" (S2305). Further, the command control unit 211 sets the copy status of the difference BM table 1911 corresponding to the track number (23-*c*) of the primary volume (23-*a*) to "updated" (S2306). The command control unit 211 refers to the TMT 1511, and if the assignment determination information of the copy destination track number (23-*g*) is "not copied", the aforementioned new track assignment (S1711: (W1) to (W6)) is performed to the copy destination track number (23-*g*) of the secondary volume.

(CW8) The command control unit 211 writes the data receives from the MF host computer 102 to the track number (23-*c*) of the primary volume (S2307).

Lastly, a notice notifying that the write command has been completed is transmitted to the MF host computer 102. The operation performed when a write access to the primary volume (23-*a*) occurs from the MF host computer 102 during data copy between the HDEV 311 having a normal volume attribute (primary volume) and the HDEV 311 having a virtual volume attribute (secondary volume) has been illustrated.

Even when a write request occurs from the MF host computer 102 to the secondary volume during data copy between the HDEV 311 having a normal volume attribute (primary volume) to the HDEV 311 having a virtual volume attribute (secondary volume), the aforementioned processes (CW1) through (CW8) can be executed to realize the write operation easily.

Figure 24:
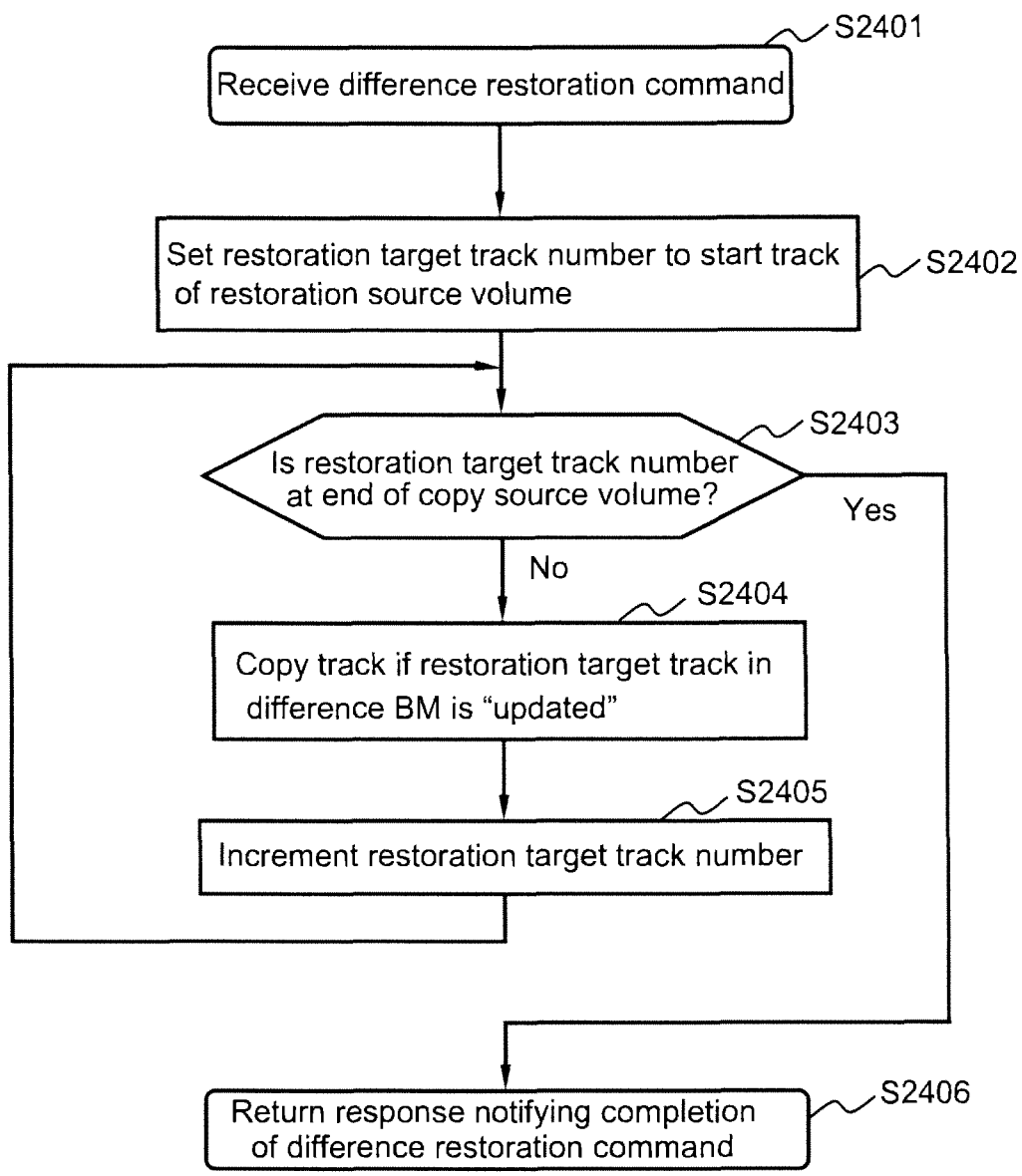
FIG. 24 is a flowchart of a difference restoration command process according to embodiment 2.

Next, a difference restoration operation from the secondary volume (24-*b*) to the primary volume (24-*a*) during data copy between the HDEV 311 having a normal volume attribute (primary volume) (24-*a*) and the HDEV 311 having a virtual volume attribute (secondary volume) (24-*b*) will be described with reference to FIG. 24.

When the command control unit 211 receives a difference restoration command with respect to a pair entry having a pair number (24-*c*) from the MF host computer 102, the following operation is performed. At this time, the command parameter is, for example, the pair number (24-*c*).

The command control unit 211 acquires a copy source HDEV number (24-*d*), a copy source track number (24-*e*), a copy destination HDEV number (24-*f*), a copy destination track range (24-*g*) and a difference BM table corresponding to the pair number (24-*c*) from a pair management table 2011. Further, the command control unit 211 performs the following processes (CR1) through (CR5) sequentially, setting a restoration target track (24-*h*) to a copy destination track start number (S2402) and continuing the process until a copy destination track end number is reached ("Yes" in S2403).

(CR1) The command control unit 211 computes the offset (24-*i*) from the copy start track number based on the restoration target track number (24-*h*) of the secondary volume (24-*b*) and the copy start track number (24-*g*) of the copy destination HDEV in the pair entry. At this time, the difference between the restoration target track number (24-*h*) and the copy start track number (24-*g*) and the offset value (24-*i*) are equal.

(CR2) The command control unit 211 computes a restoration destination track number (24-*k*) from a copy start track number (24-*j*) of the copy source HDEV in the pair entry and the offset (24-*i*). At this time, the total value of the copy start track number (24-*j*) and the offset (24-*i*) is equal to a restoration destination track number (24-*k*).

(CR3) The command control unit 211 acquires a difference status of the restoration destination track number (24-*k*) based on the offset (24-*i*) and the difference BM table 1911.

(CR4) If the difference status of the restoration destination track number (24-*k*) is "not updated", the command control unit 211 increments the restoration target track (24-*h*) (S2405) and starts the process from (CR1) without performing the process of (CR5).

(CR5) If the difference status of the restoration destination track number (24-*k*) is "updated", the command control unit 211 copies the track data of the restoration target track number (24-*h*) of the secondary volume (24-*b*) to the track of the restoration destination track number (24-*k*) of the primary volume (24-*a*) (S2404).

Lastly, a response notifying that the difference restoration command has been completed is transmitted to the MF host computer 102.

Since the secondary volume (24-*b*) is a virtual volume composed of virtual storage areas, the operation for reading data from the copy source track is similar to the operation for reading the virtual volume descried in embodiment 1. The difference restoration operation from a secondary volume (24-*b*) to an primary volume (24-*a*) in the copy pair between the HDEV 311 having a normal volume attribute (primary volume) (24-*a*) and the HDEV 311 having a virtual volume attribute (secondary volume) (24-*b*) has been described.

Figure 27:
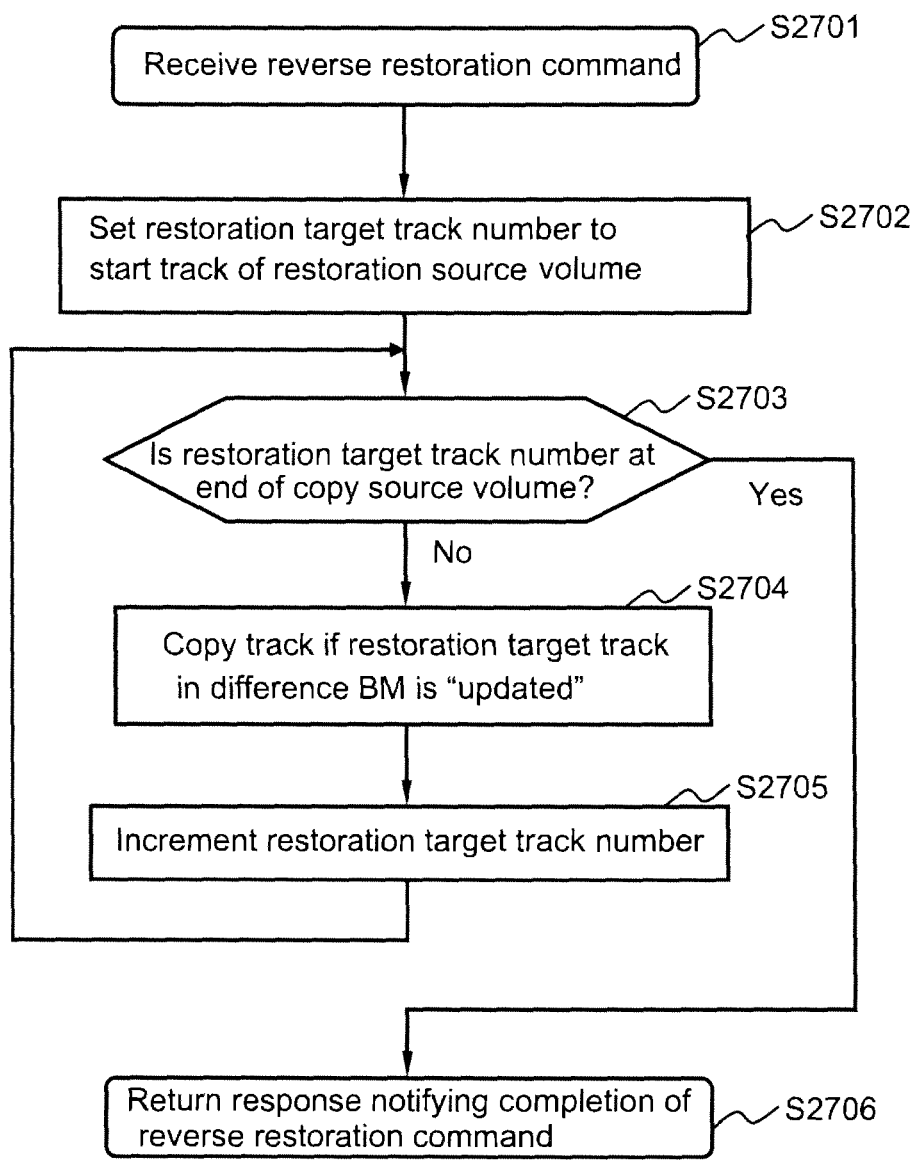
FIG. 27 is a flowchart showing a role change of volumes according to embodiment 3.

Further, as shown in FIG. 27, upon receiving a reverse restoration command from the management terminal 103, the command control unit 211 can swap the HDEV numbers of the primary volume and the secondary volume after performing the differential restoration from the secondary volume (24-*b*) to the primary volume (24-*a*), so as to enable subsequent read or write access from the MF host 102. This operation is called a reverse restoration process. Further, the steps (S24) of the difference restoration operation shown in FIG. 24 and the steps (S27) of the reverse restoration operation shown in FIG. 27 perform similar operations.

Further, if a read access or write access occurs from the MF host 102 to the restoration destination track number (24-*k*) or the restoration target track number (24-*h*) during the difference restoration operation from the secondary volume (24-*b*) to the primary volume (24-*a*), the command control unit 211 examines the difference status of the aforementioned restoration destination track number (24-*k*). As a result, if the difference status of the restoration destination track number (24-*k*) is "updated", the read or write access from the MF host 102 to the restoration destination track number (24-*k*) or the restoration target track number (24-*h*) can be enabled after executing the aforementioned process of (CR5). This operation is called an on-demand restoration process.

As can be seen from the above description, the track mapping information designed as a hierarchical memory can be accessed without crossing over the ownership during the process of copying data from the normal volume to the virtual volume.

Embodiment 3

Next, a process for freeing an assigned track in the HDEV 311 having a virtual volume attribute (when no record exists in a write target track when writing data from the MF host computer 102 to the HDEV 311 having a virtual volume attribute) will be described with reference to FIG. 25.

Figure 25:
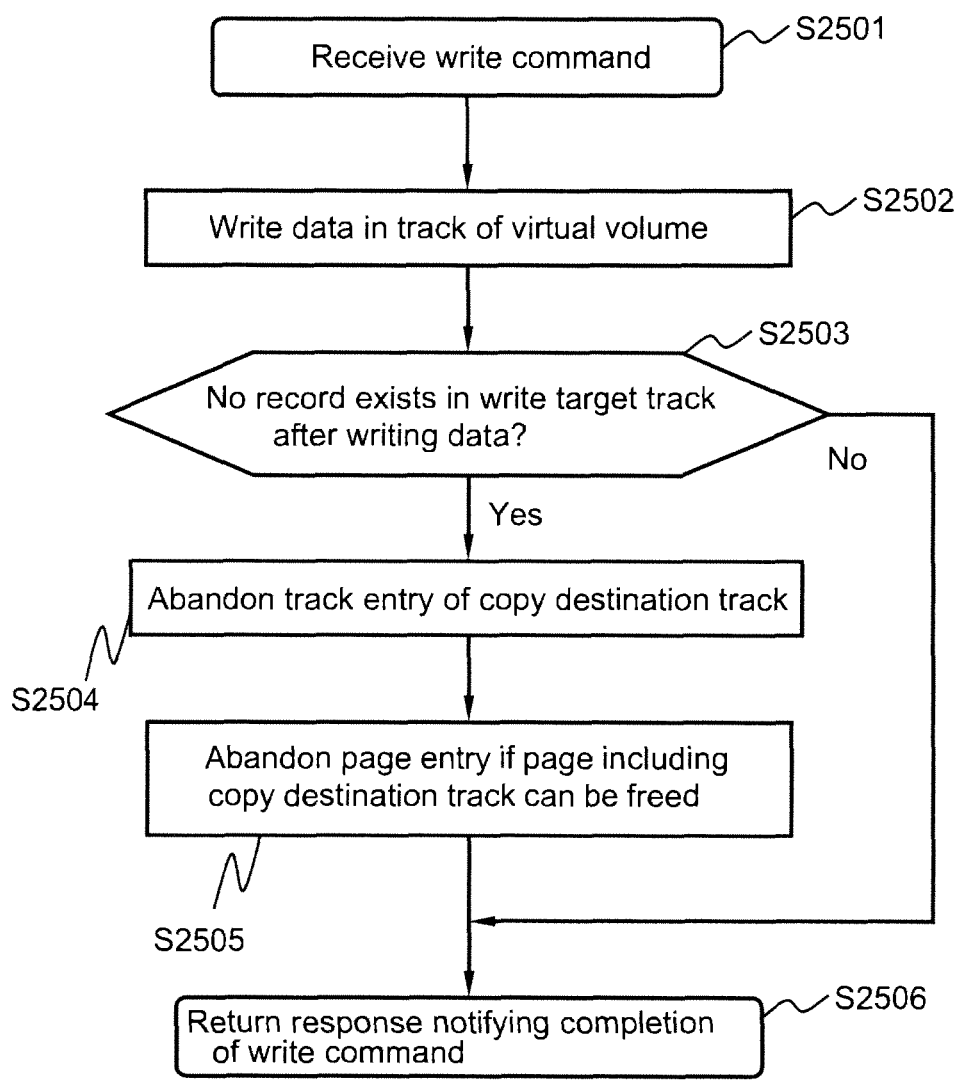
FIG. 25 is a flowchart showing a track assignment freeing process when an MF host write command occurs according to embodiment 3.

Upon receiving a write access command from the MF host computer 102 to the HDEV 311 having a virtual volume attribute, the command control unit 211 starts the operation of FIG. 25 (S2501). At this time, the command parameters are, for example, the HDEV number (25-*a*) of the primary volume (25-*a*), the track number (25-*b*) of the write target track, and the write data. The command control unit 211 writes the data transmitted from the MF host computer 102 to the write target track according to the operation when write access occurs to the virtual volume (FIG. 17) described in the aforementioned embodiment 1 (S2502).

Upon receiving a write access from the MF host computer 102, when no record exists in the write target track (S2503: "Yes"), the command control unit 211 performs the following operations (RM1) through (RM5).

(RM1) The command control unit 211 acquires a track number (25-*c*) within the LDEV based on the write target track number (25-*b*) and the TMT 1511.

(RM2) The command control unit 211 computes a page number (25-*d*) within the LDEV and the offset (25-*e*) from the start track number within the page based on the track number (25-*c*) and the page size.

(RM3) The command control unit 211 deletes (abandons) the track entry (25-*f*) corresponding to the track number (25-*b*) of the write target track in the TMT 1511 (S2504).

(RM4) Out of all track entries in which the assignment determination information in the TMT 1511 is "assigned", the command control unit 211 examines whether there exists one or more track entries (25-*g*) other than the track entry (25-*f*) in which the page number within the LDEV computed by the track number in the LDEV and the page size corresponds to the page number (25-*d*).

(RM5) If there is no track entry (25-*g*) other than the track entry (25-*f*) in the process of (RM4), the command control unit 211 deletes (abandons) the page entry corresponding to the page number (25-*d*) in the PMT 408 (S2505).

Next, the process of garbage collection and freeing of assigned pages accompanying the process of freeing assigned tracks in a virtual volume will be described. In the aforementioned processes (RM1) through (RM5) for freeing an assigned track, when one or more track entries (25-*g*) exist other than the track entry (25-*f*), the following operations (GC1) and (GC2) are executed.

(GC1) Out of the track entries in which the assignment determination information is "unassigned" in TMT 1511 (FIG. 15), a track entry in which the track number in the LDEV is greater than the track number (25-*d*) and is maximum (25-*h*) is acquired.

(GC2) The command control unit 211 enters the LDEV track number V in the track entry (25-*h*) to the track entry (25-*f*), and sets the assignment determination information to "assigned". Further, the command control unit 211 deletes the track entry (25-*h*).

This relocation of track entry is called a garbage collection.

When a track entry (25-*h*) had been deleted by the garbage collection process ((GC1) and (GC2)), the command control unit 211 can perform the processes of (RM4) and (RM5) of the process for freeing an assigned track ((RM1) to (RM5)), so as to free an assigned page. According to the present process, it becomes possible to perform reclamation and garbage collection in track units of the virtual volume, and an efficient operation of storage resources is enabled.

Embodiment 4

Figure 26:
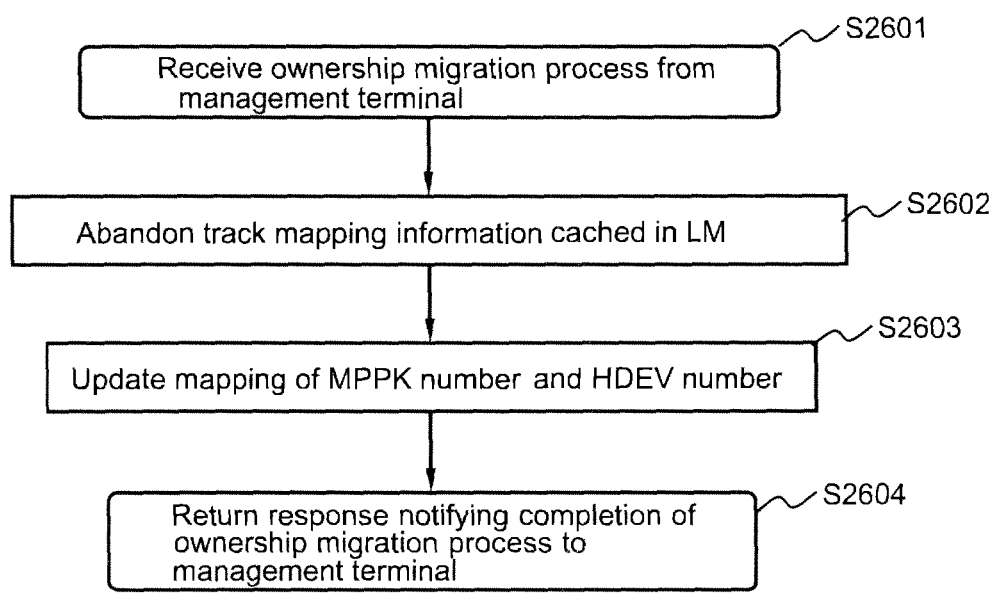
FIG. 26 is a flowchart showing an ownership migration process according to embodiment 4.

Now, the operation of ownership migration process of the HDEV 311 having a virtual volume attribute as embodiment 4 of the present invention (when the command control unit 211 receives an ownership migration request from the management terminal computer 103) is described with reference to FIG. 26. The command parameters include an ownership migration target HDEV number (26-*a*), an ownership migration source MPPK number (26-*b*) and an ownership migration destination MPPK number (26-*c*).

The command control unit 211 acquires track entries entered to the TMT 1511 of the HDEV having the ownership migration target HDEV number from the track entries cached in the LM 142 of the MPPK corresponding to the ownership migration source MPPK number (26-*b*), and abandons all the acquired track entries from the LM 142.

The command control unit 211 acquires an ownership entry (MPPK number) corresponding to the ownership migration target HDEV number (26-*a*) in the management table 401 (FIG. 5) for managing the mapping of the MPPK number and the HDEV number. The MPPK number field 501 of the ownership entry is entered to the ownership migration destination MPPK number (26-*c*). The ownership migration processing of the HDEV 311 having a virtual volume attribute has been described. According to this process, a flexible change (migration) of ownership becomes possible, and the MP 141 having the ownership migrated thereto can access the track mapping information.

Embodiment 5

Figure 28:
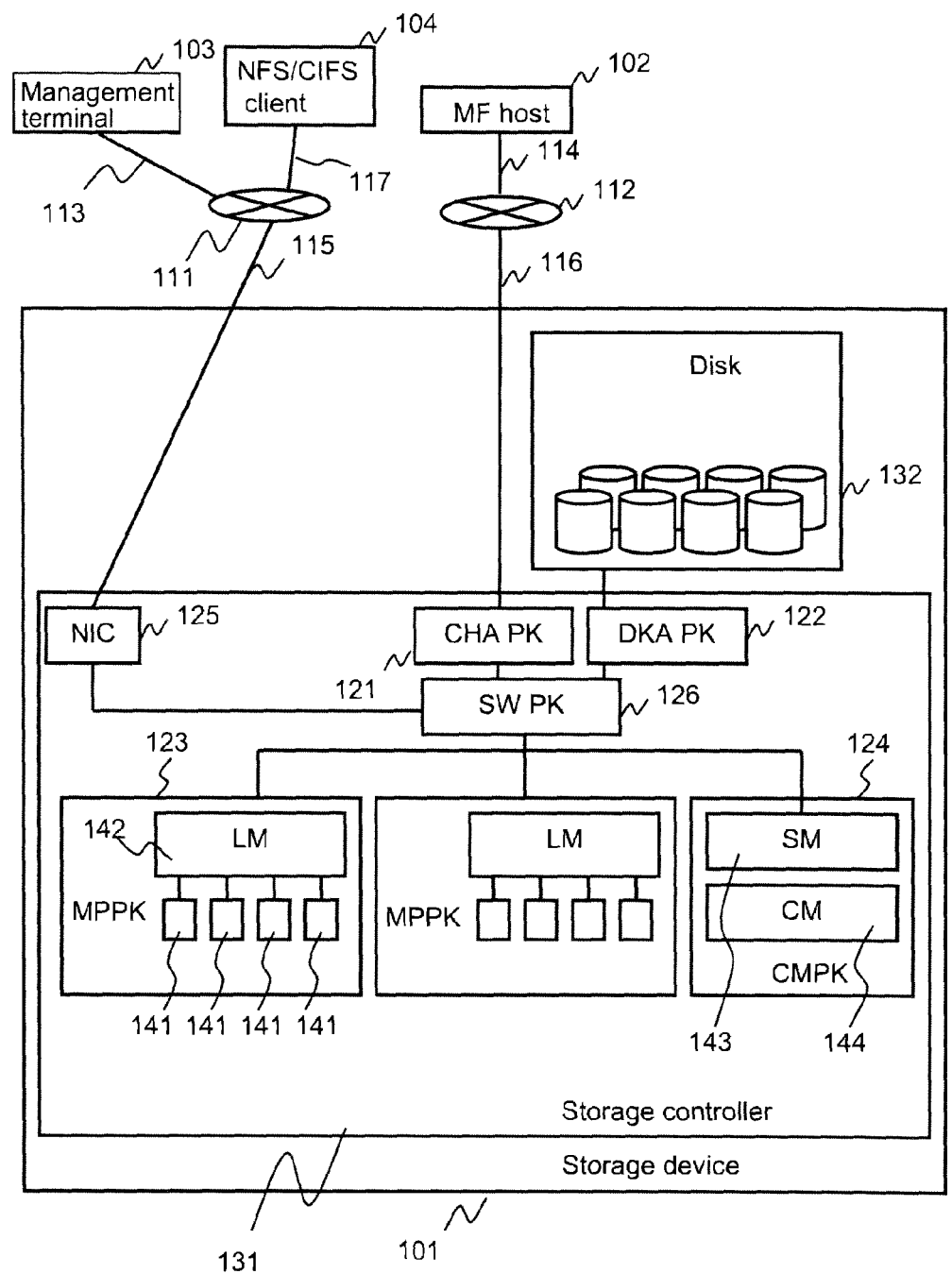
FIG. 28 is a block diagram showing an overall structure of the storage system according to embodiment 5.

Next, an access operation performed in file units according to embodiment 5 of the present invention will be described with reference to FIGS. 28 and 29. FIG. 28 is a block diagram illustrating the whole structure of a storage system, similar to FIG. 1. FIG. 28 differs from FIG. 1 in that an NFS/CIFS client 104 is connected via a communication line 117 to the network 111, and accesses the storage device 101 via file units.

Figure 29:
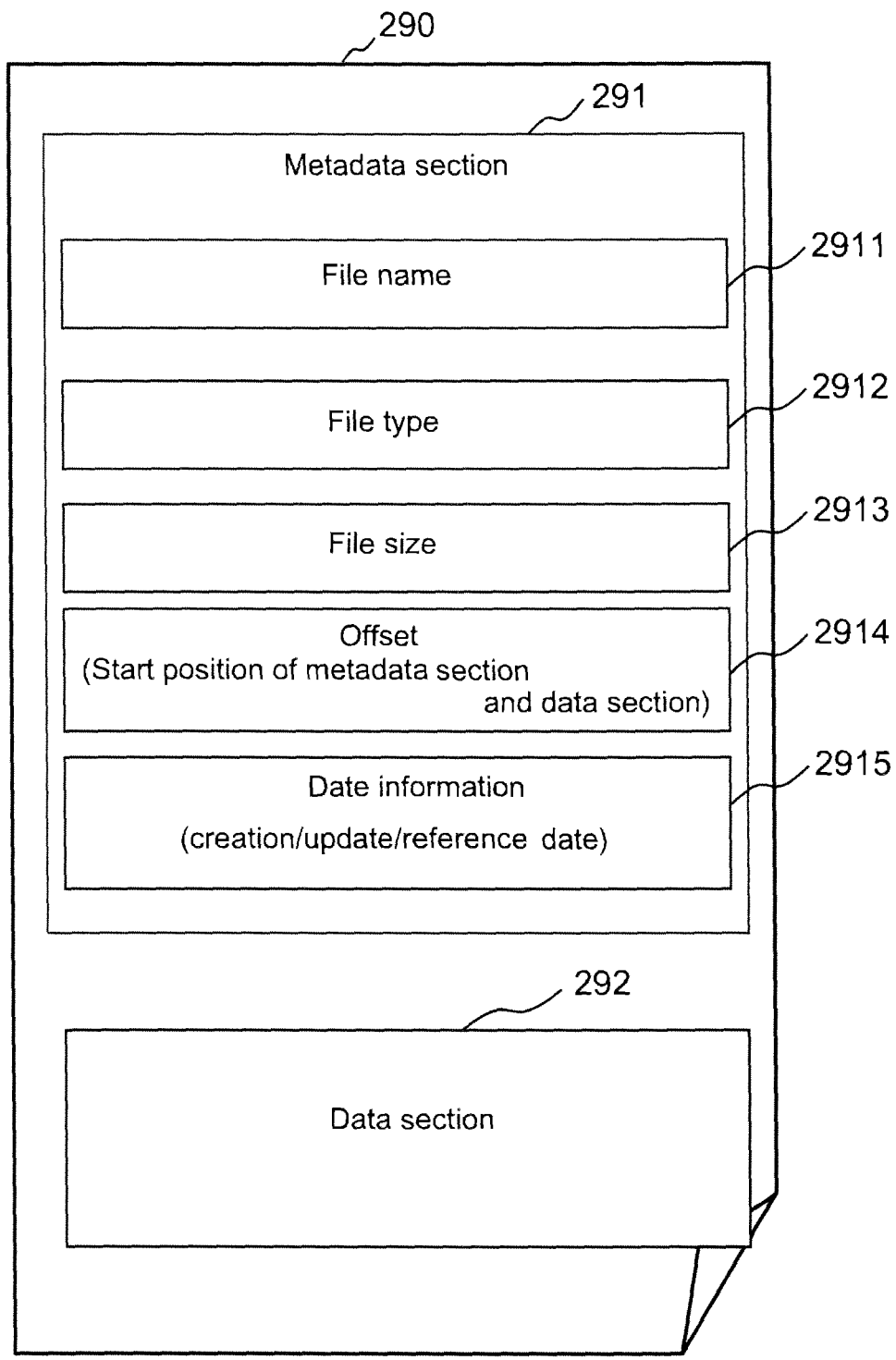
FIG. 29 is a diagram showing the configuration of a file according to embodiment 5.

Next, FIG. 29 shows a file 290 transmitted and received between the NFS/CIFS client 104 and the storage device 101. The file 290 is composed of a metadata section 291 and a data section 292. The metadata section 291 includes a file name 2911, a file type 2912, a file size 2913, an offset 2914 which is the start position of the metadata section 291 and the data section 292, and a date information 2915 when the file was created, updated or referred to (read). The metadata section 291 of the file 290 corresponds to the track control information of the access performed in block units from the MF host computer 102.

The operation of the present embodiment will now be described taking a write access request as an example. Writing of data to the file 290 (issue of a write command) is requested from the NFS/CIFS client 104 to the storage device 101. The request is transmitted via the network 111 connected to the communication line 117 and the communication line 115 to the storage device 101. The NIC 125 in the storage device 101 receives the request, and transfers the request to the MPPK 123 which is in charge of the process in the SWPK 126.

Figure 17:
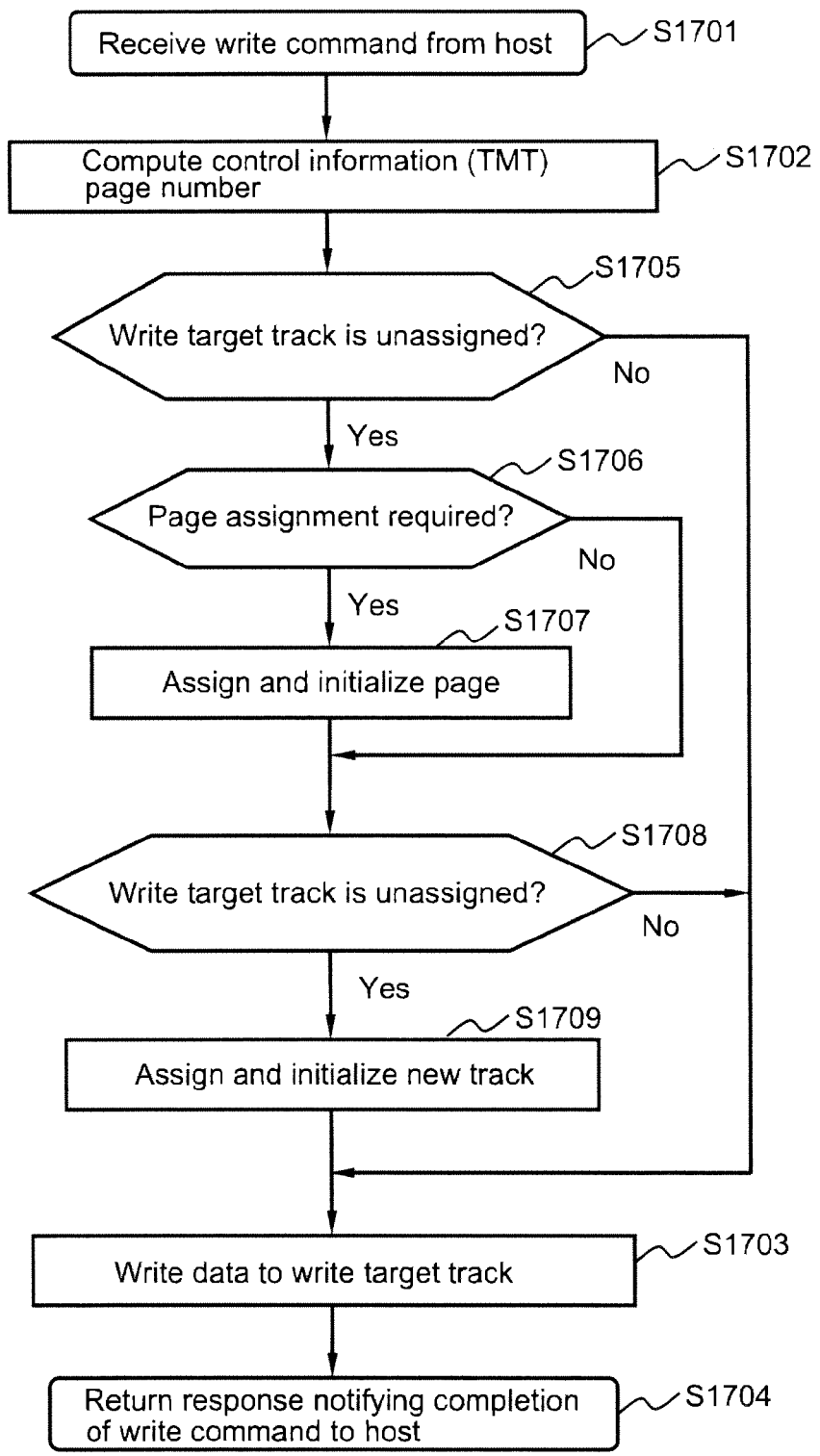
FIG. 17 is a flowchart showing a process for assigning a track to a virtual volume according to embodiment 1.

The control information during write access from the MF host computer 102 is the HDEV number, the track number in the HDEV and the track size, as described in FIG. 17. In the write access from the NFS/CIFS client 104, the information of the metadata section 291 corresponds to the control information during write access from the MF host computer 102. The unit of data writing area corresponds to the unit page size (for example, 59,392×672 bytes).

The above described process not only enables host-based accesses (block unit access) to be performed by the MF host computers 102 but also enables open-based accesses (file unit accesses) to be performed by the NFS/CIFS clients 104.

As described in embodiments 1 through 5, the track mapping information formed as a hierarchical memory in the distributed memory system can be accessed without causing crossover of ownership. Even in the case of a data copying process for copying data from a normal volume to a virtual volume, the track mapping information formed as a hierarchical memory can be accessed without causing crossover of ownership. Furthermore, the present embodiments enable reclamation and garbage collection to be performed in track units in the virtual volume, realizing efficient operation of storage resources. The present invention is not restricted to the aforementioned embodiments.

INDUSTRIAL APPLICABILITY

The present invention can be applied to information processing apparatuses such as large-scale computers, servers and personal computers, or to information/image storage apparatuses such as storage systems and HDD recorders.

REFERENCE SIGNS LIST

101 Storage devices
102 MF (Main Frame) host computer
103 Management terminal computer
104 NFS/CIFS client
111, 112 Network
113, 114, 115, 116 Communication line
121 CHAPK (CHannel Adapter PacKage)
122 DKAPK (DisK Adapter PacKage)
123 MPPK (Micro Processor PacKage)
124 CMPK (Cache Memory PacKage)
125 NIC (Network Interface Card)
126 SWPK (SWitch PacKage)
131 Storage controller
132, 314 Disk
141 MP (Micro Processor)
142 LM (Local Memory)
143 SM (Shared Memory)
144 CM (Cache Memory)
201 Microprogram
202 CM control information
203 Cache of the management table
211 Command control unit
212 RAID control unit
213 Ownership control unit
290 File
291 Metadata section
292 Data section
301, 3011, 3012 OS (Operating System)
311 Logical device for host (HDEV)
312 Logical device (LDEV)
313 Pool
401 Management table mapping MPPK number—HDEV number
402 Management table mapping HDEV number—LDEV number
403 Management table mapping HDEV number field—volume size
404 Management table mapping HDEV number—volume attribute
405 Management table mapping HDEV number—disk number
406 Management table mapping LDEV number—pool number—PMT (Page Mapping Table) address
407 Management table mapping pool number—disk number
408 PMT (Page Mapping Table)
409 PMT management directory
410 TMT (Track Mapping Table) management directory
501 MPPK number field
502 HDEV number field
601 HDEV number field
602 LDEV number field
701 HDEV number field
702 Volume size field
801 HDEV number field
802 Volume attribute field
901 HDEV number field
902 Disk number field
1001 LDEV number field
1002 Pool number field
1003 PMT address field
1101 Pool number field
1102 Disk number field
1201 Page number field
1202 Page type field
1203 Page start address field within LDEV
1204 Disk number field
1205 Page start address field within disk
1206 Page assignment determination information field
1301 LDEV number field
1302 PMT address field
1401 LDEV number field
1402 Initial data track number field within LDEV
1403 Subsequent assignment track number field within LDEV 1511 TMT table
1501 Track number field within HDEV
1502 Track number field within LDEV
1503 Track assignment determination information field
1811 Copy BM table
1801 Track number field
1802 Copy status field
1911 Table managing track number and update status (difference BM table)
1901 Track number field
1902 Update status field
2011 Pair management table
2001 Pair number field
2002 Copy source HDEV number field
2003 Copy source track number field
2004 Copy destination HDEV number field
2005 Copy destination track range field
2006 Copy BM table address field
2007 Difference BM table address field
2911 File name
2912 File type
2913 File size
2914 Offset
2915 Date information

The invention claimed is:

1. A storage system coupled to a computer, comprising:
a control unit configured to receive read or write requests from the computer; and
a physical storage device configured to store data used by the computer;
wherein the control unit is further configured to:
manage a first virtual volume which is a virtual storage area provided to the computer, manage a second virtual volume which is a virtual storage area associated with the first virtual volume by using a plurality of tracks and a plurality of pages including the plurality of tracks, and manage a real data storage area which is configured from the physical storage device;
allocate, when storing data as a target of a write request from the computer, the real data storage area to a first page among the plurality of pages including a first track that is allocated to the target area of the write request among the plurality of the tracks, and allocate the first track to the first virtual volume;
determine, when storing the data as the target of the write request from the computer, whether or not the first track has a record for storing the data as the target of the write request from the computer; and
free the first track from the allocation to the first virtual volume when it is determined that the first track does not have a record.

2. The storage device according to claim 1,
wherein the control unit is further configured to:
determine, after freeing the first track, whether there exists a track that is included in the first page and is allocated to the first virtual volume, and
free the first page when it is determined that there exists no track that is included in the first page and is allocated to the first virtual volume.

3. The storage system according to claim 1, wherein the control unit is further configured to determine, when allocating the first track to the target area of the write request among the plurality of tracks, a second track that is to be subsequently allocated.

4. The storage system according to claim 1, wherein the control unit is further configured to allocate, after allocating the first track and when storing data as a target of a further write request from the computer, a second track to the target area of the further write request among the plurality of the tracks.

5. The storage system according to claim 4, wherein the control unit is further configured to determine, when allocating the second track to the target area of the further write request among the plurality of the tracks, a third track that is to be subsequently allocated, by increasing a value of an address of the second track.

* * * * *